US008170502B2

(12) United States Patent
Seshadri et al.

(10) Patent No.: US 8,170,502 B2
(45) Date of Patent: May 1, 2012

(54) PHASE PULSE SYSTEM AND METHOD FOR BANDWIDTH AND ENERGY EFFICIENT CONTINUOUS PHASE MODULATION

(75) Inventors: Rohit Seshadri, Gaithersburg, MD (US);
Bassel F. Beidas, Alexandria, VA (US);
Mustafa Eroz, Germantown, MD (US);
Lin-Nan Lee, Potomac, MD (US)

(73) Assignee: Hughes Network Systems, LLC,
Germantown, MD (US)

( * ) Notice: Subject to any disclaimer, the term of this patent is extended or adjusted under 35 U.S.C. 154(b) by 20 days.

(21) Appl. No.: 12/894,380

(22) Filed: Sep. 30, 2010

(65) Prior Publication Data

US 2011/0275338 A1 Nov. 10, 2011

Related U.S. Application Data

(60) Provisional application No. 61/331,070, filed on May 4, 2010.

(51) Int. Cl.
*H04B 1/02* (2006.01)
(52) U.S. Cl. ................. 455/102; 375/302; 375/322
(58) Field of Classification Search ............... 455/550.1, 455/562.1, 101, 102, 103, 114.1, 115.1, 130, 455/131, 205, 296; 375/267, 295, 296, 299, 375/302, 322
See application file for complete search history.

(56) References Cited

U.S. PATENT DOCUMENTS

| 7,010,053 B2* | 3/2006 | El-Gamal et al. | 455/101 |
| 2005/0220210 A1* | 10/2005 | Hammons, Jr. | 375/267 |
| 2011/0150125 A1* | 6/2011 | Yu et al. | 375/295 |

* cited by examiner

*Primary Examiner* — Thanh Le
(74) *Attorney, Agent, or Firm* — Ditthavong Mori & Steiner, P.C.

(57) ABSTRACT

A new pulse shape for CPM is introduced which is obtained by a linear combination of well-known RC and REC pulse shapes. The new pulse shape addresses the tradeoff between the width of the PSD main lobe and the rate of decay of the side lobe to improve the coded performance of multi-carrier systems affected by ACI. Also, a methodology is proposed to design and evaluate the performance of the new pulse shape for multi-carrier, coded systems based on the modulation constrained capacity. Furthermore, a binary convolutional code and the CPM modulator are concatenated using an S-random bit interleaver to lower the error floor. Finally, Laurent representation of the new pulse shape is suggested such that by retaining only the principal pulses at the receiver, complexity of the receiver can be reduced.

20 Claims, 10 Drawing Sheets

PHASE PULSE SYSTEM AND METHOD FOR BANDWIDTH AND ENERGY EFFICIENT CONTINUOUS PHASE MODULATION

The present application claims priority from U.S. Provisional Application No. 61/331,070 filed May 14, 2010, the entire disclosure of which is incorporated herein by reference.

BACKGROUND

The present invention relates to the field of wireless communication systems, in particular, coded performance of multi-user systems in the presence of adjacent channel interference (ACI).

Spectral spreading is problem in systems in which the communication channel is shared by several users, wherein one channel "bleeds over" into another channel, which is referred to as ACI. This ACI problem worsens as the spacing between channels decreases.

In multi-user systems, for example, frequency division multiplexed (FDM) systems, ACI can seriously impair performance, especially when high bandwidth efficiencies are desired. In order to achieve high bandwidth/spectral efficiencies, the frequency separation between the adjacent channels must be reduced, causing an increase in ACI and resulting in performance degradation. A common practice to improve the performance is by applying interference cancellation at the receiver however, this entails an increase in complexity.

Alternatively single-user detection can be applied, in which the performance could be improved through a more judicious choice of the modulation and channel (error correction) coding, for example, through the use of continuous phase modulation (CPM). Through a careful design of the CPM phase pulse and selection of the remaining modulation parameters, power spectrum of the CPM signal can be shaped to improve the resistance to ACI. CPM can also provide excellent energy efficiency, for instance, by using binary convolutional codes, ring-convolutional codes, low density parity check (LDPC) codes, irregular, repeat-accumulate codes and more recently, extended BCH codes.

Pulse shape designs for single-user uncoded CPM and pulse shapes designed using higher order polynomials for binary CPM are known in the art. These are designed to maximize the minimum squared Euclidean distance for a specific effective signal bandwidth. Similarly, higher order polynomials are also used to design pulse shapes for partial response binary CPM. These pulse shapes are designed to maximize the minimum Euclidean distance of the uncoded modulation, subject to the constraint that the resulting power spectrum stays below a pre-defined mask. However, the minimum Euclidian distance based design known in the art is suboptimal for the coded multi-user systems since it does not explicitly consider the effect of ACI and the channel code.

All the methods discussed in the preceding paragraph are limited to uncoded, single user systems. The power and efficiency advantages offered by CPM generally come at the cost of high complexity receivers because of the non-linear nature of the modulation format. This will be described further using a system model with a transmitter and a receiver with reference to FIGS. 1-2.

FIG. 1 illustrates a conventional transmitter 100 and channel for a conventional multi-user system.

As illustrated in FIG. 1, transmitter 100 includes a transmitting source 102, a transmitting source 104 and a transmitting source 106. Transmitting source 102 further includes a bit source 108, a binary convolutional coder 110, an S-random interleaver 112, a CPM 114, a mixer 116, a multiplier 118. Transmitting source 104 further includes a bit source 120, a binary convolutional coder 122, an S-random interleaver 124, a CPM 126, a mixer 128, a multiplier 130. Transmitting source 106 further includes a bit source 132, a binary convolutional coder 134, an S-random interleaver 136, a CPM 138, a mixer 140, a multiplier 142. An adder 144 models the ACI and an adder 146 models the additive white Gaussian noise i.e. AWGN. Transmitter 100 may not strictly include adder 144 and adder 146. Adder 144 and adder 146 can be thought of as the channel, but they are grouped in with transmitter 100 for convenience.

In this figure, each of bit source 108, binary convolutional coder 110, S-random interleaver 112, CPM 114, mixer 116, multiplier 118, bit source 120, binary convolutional coder 122, S-random interleaver 124, CPM 126, mixer 128, multiplier 130, bit source 132, binary convolutional coder 134, S-random interleaver 136, CPM 138, mixer 140, multiplier 142, adder 144 and adder 146 are illustrated as distinct devices. However, at least one of bit source 108, binary convolutional coder 110, S-random interleaver 112, CPM 114, mixer 116, multiplier 118, bit source 120, binary convolutional coder 122, S-random interleaver 124, CPM 126, mixer 128, multiplier 130, bit source 132, binary convolutional coder 134, S-random interleaver 136, CPM 138, mixer 140, multiplier 142, adder 144 and adder 146 may be combined as a unitary device.

Transmitting sources 102, 104 and 106 are shown in FIG. 1, however, there could be K users sharing the same channel, where K>1, resulting in interference. Operation of transmitting source 102 is described further in detail.

Bit source 108 is operable to provide information data bits signal 148 for transmitting source 102 to binary convolutional coder 110. Non-limiting examples for bit source 108 include data, images, video, audio, etc.

Binary convolutional coder 110 is operable to receive information data bits signal 148 and provides encoded data bits signal 150 to S-random interleaver 112. Binary convolutional coder 110 provides forward error correction by adding redundancy to information data bits signal 148. Forward error correction (FEC) improves the capacity of a channel by adding some carefully designed redundant information to the data being transmitted through the channel. Binary convolution coding is a form of channel coding to add this redundant information to the data.

S-random interleaver 112 is operable to scramble the encoded data bits 150 by rearranging the bit sequence in order to improve error rate performance and lower the error floors. Interleaving is a process of rearranging the ordering of a data sequence in a one to one deterministic format. The inverse of this process is calling deinterleaving, which restores the received sequence to its original order. Interleaving is used to enhance the error correcting capability of coding. An S-random interleaver (where S=1, 2, 3 . . . ) is a "semi-random" interleaver, which changes the order of the data sequence of incoming input bits, and generally provides the permuted data sequence in the form of an interleaving matrix.

CPM modulator 114 is operable to receive the data symbols after bit-to-symbol mapping of scrambled codebits 152. CPM modulator 114 generates a CPM signal 154 such that its phase transitions do not exhibit any discontinuity from one symbol epoch to the next (i.e. the phase of the modulated signal varies continuously with time). The phase continuity and smooth phase transitions enable the transmitted signal to have relatively small power spectral side-lobes. CPM modulator 114 provides CPM signal 154 to frequency mixer 116.

Frequency mixer 116 is operable to receive CPM signal 154 from CPM 114 and mix CPM signal 154 with signal 156 to generate mixed signal 158. Signal 156 may be represented as $\exp(j2\pi f_1 t)$. Frequency mixer 116 frequency translates CPM signal 154 from CPM 114. For example, if the center frequency of CPM signal 154 at the output of CPM 114 is $f_0$, then, the center frequency of CPM signal 154 at the output of frequency mixer 116 becomes $(f_0+f_1)$.

Multiplier 118 is operable to receive mixed signal 158 from mixer 116 and multiply it with signal 160. Signal 160 may be represented as $\sigma_1$, which is used to adjust the power level of signal 158.

Transmitting sources 104 and 106 operate in the similar manner as transmitting source 102, therefore are not described here. CPM signal 170 from transmitting source 104 is mixed with $\exp(j2\pi f_2 t)$ and multiplied with $\sigma_2$ before going to adder 144. Similarly, CPM signal 188 from transmitting source 106 is mixed with $\exp(j2\pi f_K t)$ and multiplied with $\sigma_K$ before going to adder 144, where K>1.

Adder 144 is operable to receive output signal 180 from transmitting source 104 and output signal 196 from transmitting source 106 along with output signal 162 from transmitting source 102 and provides composite CPM signal 197 to adder 146. In case of more than three transmitting sources, adder 144 is operable to receive outputs signals from those transmitting sources as well. Adder 144 models the effect of the ACI, which occurs in bandwidth limited communication systems.

Composite CPM signal 197 out of adder 144 is added with another signal 198 by adder 146. Signal 198 may be represented by $n(t) \sim \eta(0,N_0)$. Signal 198 is added to model Additive White Gaussian Noise (AWGN) for transmission through the channel. Output signal 199 of adder 146 represents a transmitted signal from a multi-user system, which may be received by a receiver of the multi-user system, as will now be discussed with reference to FIG. 2.

FIG. 2 illustrates a conventional receiver 200 for a user k of a multi-user system.

As illustrated in FIG. 2, receiver 200 includes a mixer 202, a matched filter bank 204, a CPM detector 206, an S-random deinterleaver 208, a binary convolutional decoder 210 and an S-random interleaver 212. In this illustration, each of mixer 202, matched filter bank 204, CPM detector 206, S-random deinterleaver 208, binary convolutional decoder 210 and S-random interleaver 212 are illustrated as distinct devices. However, at least one of mixer 202, correlator 204, CPM detector 206, S-random deinterleaver 208, binary convolutional decoder 210 and S-random interleaver 212 may be combined as a unitary device.

Mixer 202 is operable to receive channel output signal 214 from a transmitting source, for example, channel output signal 199 from transmitter 100, and mix channel output signal 214 with signal 216 to output signal 218. Signal 216 may be represented as $\exp(-j2\pi f_k t)/\sigma_k$ for receiver k. Mixer 202 performs the reverse operation of the mixer and multiplier of the transmitting source in order to frequency translate and apply amplitude correction before recovering the transmitted signal.

Matched filter bank 204 is operable to receive signal 218 and provide signal 220 to CPM detector 206. Matched filter bank 204 may operate to filter the received signal 218 with N possible reference signals, where N is a finite integer number and depends on the choice of the CPM modulation parameters. Matched filter bank 204 provides a matrix, which contains statistical indication as to which of the possible transmitted signals may be the received signal 218.

CPM detector 206 is operable to receive signal 220 from matched filter bank 204 and a priori information 232 from S-random interleaver 212. CPM detector 206 uses the statistics provided by matched filter bank 204 within signal 220 to perform decoding using a decoding algorithm like Viterbi or BCJR algorithm for providing an estimate of the transmitted symbols (or equivalently of the transmitted codebits). CPM detector 206 may also operate to receive scrambled a priori probability information 232 of the transmitted codebits being either a 1 or a 0 (i.e. bits generated by the convolutional code) from S-random interleaver 212 in order to provide a better estimate of the transmitted signal.

Every interleaver has a corresponding deinterleaver, which acts on the interleaved data sequence and restores it to its original order. S-random deinterleaver 208 is operable to receive probability estimates of the transmitted codebits being either a 1 or a 0, in the form of extrinsic information 224 from CPM detector 206 and provides descrambled probability estimates 226 to binary convolutional decoder 210.

Binary convolutional decoder 210 is operable to decode using descrambled probability estimates 226 by using a decoding algorithm, for example, Viterbi, BCJR and provides a bit sequence 228 and updated probability estimates of the transmitted codebits 230 being either a 1 or a 0.

S-random interleaver 212 is operable to improve the error rate performance by feeding the scrambled probability estimates as a priori information 232 back to CPM detector 206. The goal of receiver 200 is to process the received signal such that bit sequence 228 recovered by receiver 200 matches the bit source provided by transmitting source k.

The first pass through CPM detector 206, S-random deinterleaver 208 and binary convolutional decoder 210 provides an estimate of bit sequence 228 which may match with the transmitted bit source. The operation of S-random interleaver 212 providing feedback to CPM detector 206 improves the signal estimate with successive iterations though the feedback loop, until recovered information matches information provided by the transmitting source or until a maximum number of iterations are performed, whichever occurs first.

The operation of a conventional transmitting source, which involved encoding, scrambling and modulation of a bit source for transmission via a channel of a multi-user system was discussed previously with respect to FIG. 1. The operation of a conventional receiver, which involved correlating, descrambling and decoding of the received bit source from the channel of the multi-user system to recover the original bit source, was discussed with respect to FIG. 2.

The phase response used in the CPM modulator and power spectral density (PSD) of the signal at the modulator output which is transmitted through a multi-user system and received by a receiver will now be discussed with reference to FIGS. 3-4.

FIG. 3 illustrates a graph 300 for CPM phase response with t/T for a conventional rectangular (REC) and raised-cosine (RC) pulses.

As illustrated in the figure, a y-axis 302 represents CPM phase response in radians and an x-axis 304 represents time normalized by symbol duration or time multiplied by symbol rate (t/T). CPM phase response is represented by a function q(t). The CPM phase response is obtained by integrating the CPM pulse shape over time. Graph 300 includes a curve 306, which represents the phase response $q_{RE}(t)$ for a rectangular (REC) pulse shape and a curve 308 which represents the phase response $q_{RC}(t)$ for a raised cosine RC pulse.

The purpose of function q(t) is to smooth out the phase transitions of the modulated signal. A more gradual variation of q(t) with time results in the modulated signal having smaller spectral side-lobes. Curves 306 and 308 provide a different power spectrum. Curves 306 and 308 are responses from a conventional CPM like CPM 114 or CPM 126 as described in FIG. 1.

FIG. 4 illustrates a graph 400 for PSD with frequency/symbol rate for conventional REC and RC pulses.

As illustrated in the figure, a y-axis 402 represents PSD in dB and an x-axis 404 represents frequency/symbol rate. Graph 400 includes a curve 406, which represents the PSD for a REC pulse and a curve 408 which represents the PSD for a RC pulse.

It is obvious from curve 406 that the CPM signal obtained from a modulator using REC pulse shapes have PSDs with a narrower main lobe and larger side lobes. Similarly, curve 408 represents the CPM signal obtained from a modulator using RC pulse shapes, which have PSDs with relatively smaller side-lobes, but wider main lobes.

It was shown using FIGS. 3-4, how conventional RC and REC pulses perform in a multi-user system in the presence of ACI. A narrow spectral main lobe (as exhibited by CPM signals using REC pulse shapes) can allow the adjacent users to be spaced closer, which would allow a more bandwidth efficient transmission. However, if the spectral side lobes are large, then the interference caused to neighboring users is more, which causes performance degradation. Hence smaller or rapidly decaying spectral side lobes (as exhibited by CPM signals using RC pulse shapes) are desirable. Conversely, since these signals have a wider main lobe, the adjacent carriers would have to be spaced further apart to minimize performance degradation due to ACI. This however reduces the bandwidth efficiency of the communication system.

In order to improve the coded performance of multi-user systems affected by ACI and to also provide higher bandwidth efficiencies; it is desirable for the signal PSD to have a narrow main lobe in order to allow signaling at higher spectral efficiencies by reducing the separation between the adjacent carriers. Additionally, it is advantageous to have a fast spectral roll-off (i.e., small side lobes) in order to minimize interference to neighboring carriers. There is a tradeoff between the width of the PSD main lobe and the rate of decay of the side lobes.

What is needed is a pulse shape that addresses the tradeoff between the width of the PSD main lobe and the rate of decay of the side lobe in a multi-user system to maximize the channel capacity but minimize the channel interference.

BRIEF SUMMARY

In accordance with an aspect of the present invention a system and method are provided for producing a pulse shape that addresses the tradeoff between the width of the PSD main lobe and the rate of side lobe decay in a multi-user system to maximize the channel capacity and minimize the channel interference. In an alternate aspect of the invention, the proposed pulse shape may be represented by a Laurent decomposition in order to derive low complexity receivers.

In accordance with an aspect of the present invention, a device is provided for use with a bit source operable to provide a source data stream. The device includes a binary convolutional coder and a continuous phase modulator. The binary convolutional coder can output a binary code stream based on the source data stream. The continuous phase modulator can output a modulated waveform based on the symbol stream obtained from the interleaved binary codebit stream. The performance and the power spectrum of the CPM signal depends upon the choice of the alphabet size M, modulation index h, the CPM pulse shape and the width of the CPM pulse shape in symbol durations. A larger M enables more bits to be transmitted with every modulated symbol; however, the main lobe of the signal power spectrum also gets wider with increasing M, which makes the signal more susceptible to ACI. In a single-user system (i.e. when there are no other users sharing the channel), a larger h is desirable because it results in an improved error rate performance. However, a larger h also results in the CPM signal having a wider power spectrum. Hence in the presence of adjacent carrier interference, there is a trade-off between the performance improvement from choosing a larger h and the performance degradation resulting from the increase in ACI caused by the wider power spectrum due to a large h. For a fixed M and h, the power spectrum can be shaped by the choice of the pulse shape. The CPM phase response is obtained by integrating the pulse shape and it influences the phase transitions of the modulated signal, wherein $q_{av}$ is a continuous phase modulation phase response of the CPM modulator; wherein $q_{rc}$ is a continuous phase modulation phase response of a CPM modulator using a RC pulse shape; and wherein $q_{re}$ is a continuous phase modulation phase response of a CPM modulator using a REC pulse shape. When $q_{rc}$ is less than $q_{re}$, then $q_{rc} < q_{av} < q_{re}$. When $q_{re}$ is less than $q_{rc}$, then $q_{re} < q_{av} < q_{rc}$.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
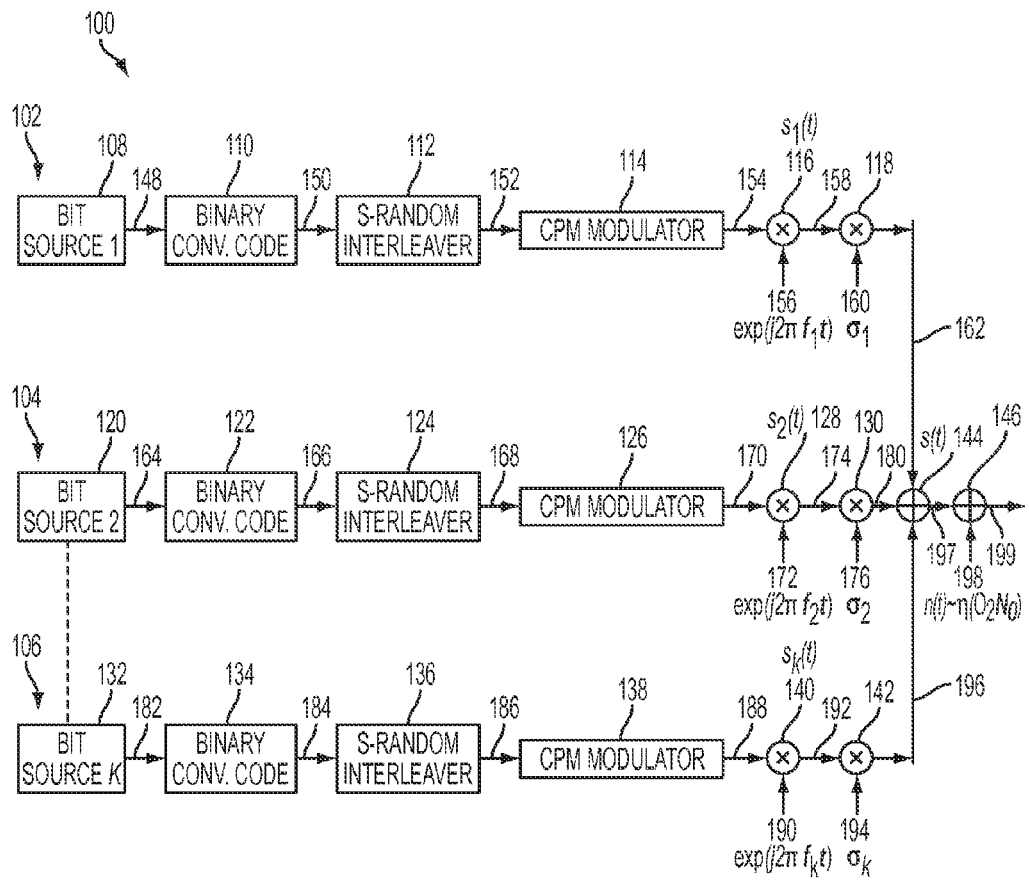
FIG. 1 illustrates a conventional transmitter and channel for a conventional multi-user system.
Figure 2:
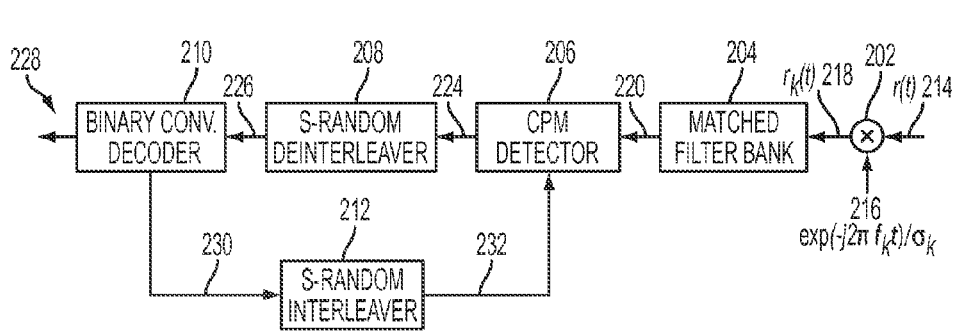
FIG. 2 illustrates a conventional receiver for a user k of a multi-user system.
Figure 3:
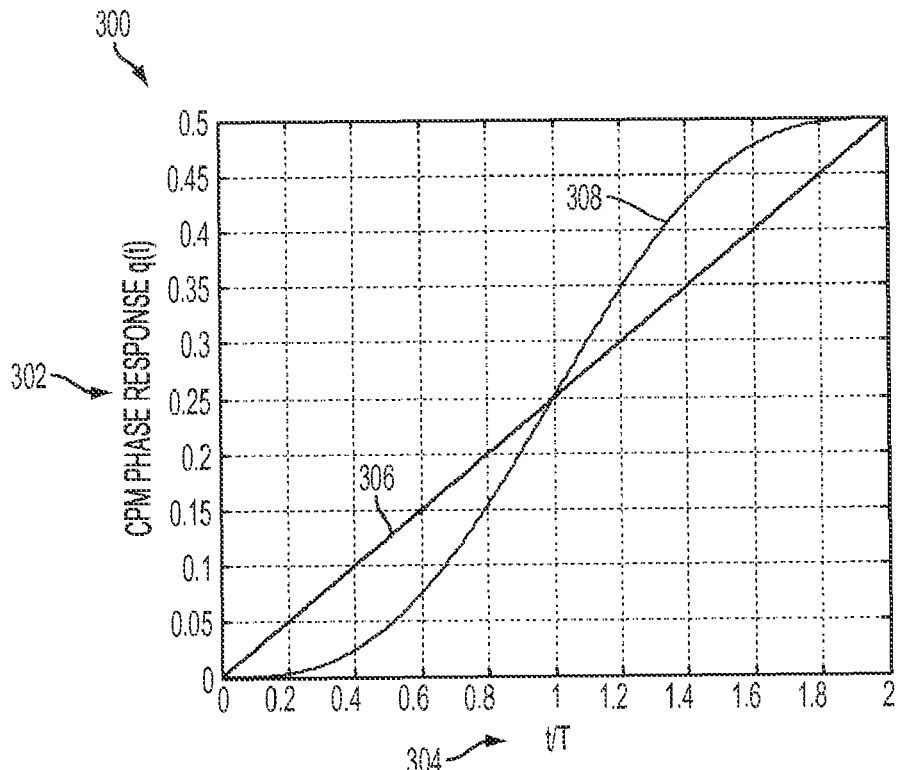
FIG. 3 is a graph of a CPM phase response with t/T for conventional REC and RC pulses.
Figure 4:
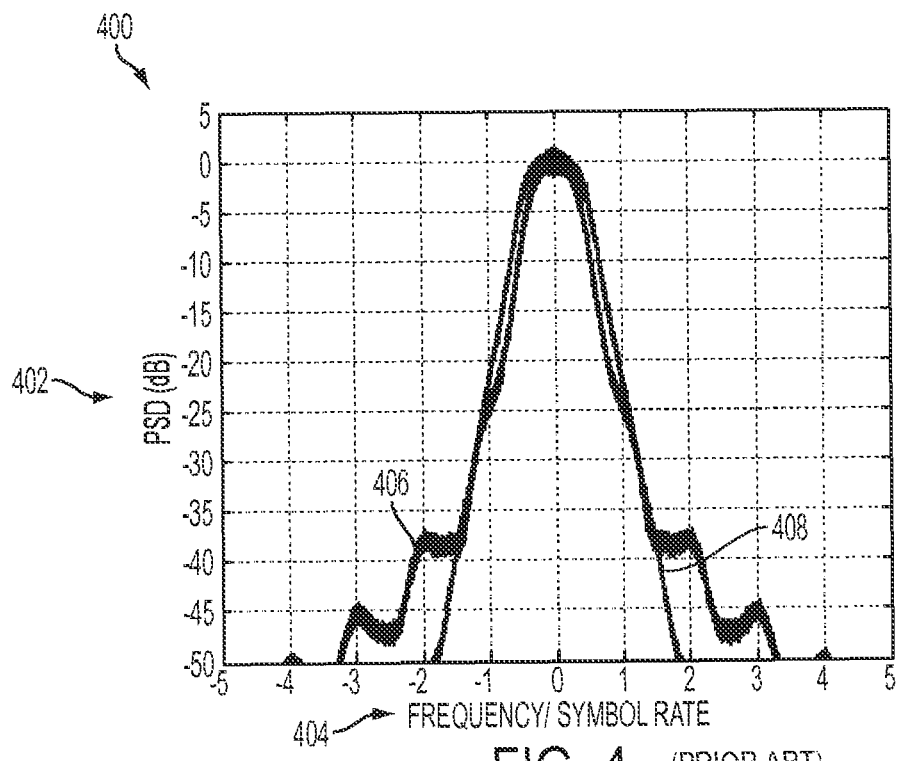
FIG. 4 is a graph of a PSD with frequency/symbol rate for conventional REC and RC pulses.

In accordance with an aspect of the present invention, a new pulse shape is proposed that addresses the tradeoff between the width of the PSD main lobe and the rate of decay of the side lobe in the multi-user system. The new pulse shape proposed is a linear combination of the REC and RC phase pulses. By selecting the coefficients (or "weights") in the linear combination, the main lobe and the side lobes can be shaped to meet the desired energy and bandwidth efficiency requirements. Specifically, the new pulse shape addresses the tradeoff between the width of the PSD main lobe and the rate of decay of the side lobe to improve the coded performance of multi-user systems affected by ACI. Also, a methodology is proposed to design and evaluate the performance of the new pulse shape for multi-user, coded systems based on the modulation constrained capacity. Furthermore, a binary convolutional coder and a CPM modulator are concatenated using an S-random bit interleaver to lower the error floor. In accordance with an alternate aspect of the invention, the proposed pulse shape may be represented by a Laurent decomposition in order to derive low complexity receivers.

The present invention uses information theory to evaluate the coefficients, based on the constrained capacity of the system. More specifically, the design metric/cost-function is the information theoretical minimum $E_b/N_0$ required for reliable signaling, under constraints of a class of modulation (i.e., CPM), equally likely input symbols, and desired bandwidth efficiency, while using a coherent receiver in the presence of ACI.

Capacity based design has many advantages. The capacity specifies the fundamental performance limits for a coded system. It inherently takes into account the effect of the CPM parameters (M, pulse width L, h and pulse shape) and the code rate on the tradeoff between energy efficiency and spectral efficiency. More importantly, it is also a very practical indicator of system performance, as demonstrated by the error rate simulations.

A binary convolutional code is proposed for forward error correction. An example coding paradigm that may be used is known as bit-interleaved coded modulation, with iterative decoding (BICM-ID), in which a bit-interleaver is used between the encoder and the modulator. Coded CPM systems using binary convolutional codes have been shown to perform very well in the waterfall region of the error rate curve. However, these coded systems are known to have relatively high error floors with the use of pseudo-random bit-interleavers.

The present invention overcomes this drawback by concatenating the binary convolutional coder and the CPM modulator using S-random bit-interleavers (S is called the interleaver spread). Error rate simulations obtained after applying S random bit interleavers to convolutional coded CPM systems in a BICM-ID frame work confirm the absence of an error floor even at very low frame error rates of around $10^{-5}$.

In summary, the present invention proposes a new family of phase pulses for CPM, which are obtained by a linear combination of REC and RC phase pulses. It also proposes a methodology to design and evaluate the performance of the new pulse shapes for multi-carrier, coded systems based on the modulation constrained capacity. Finally, a binary convolutional coder and a CPM modulator are concatenated using an S-random bit interleaver to lower the error floor.

A multi-carrier system model is used to describe the present invention in detail.

Figure 5:
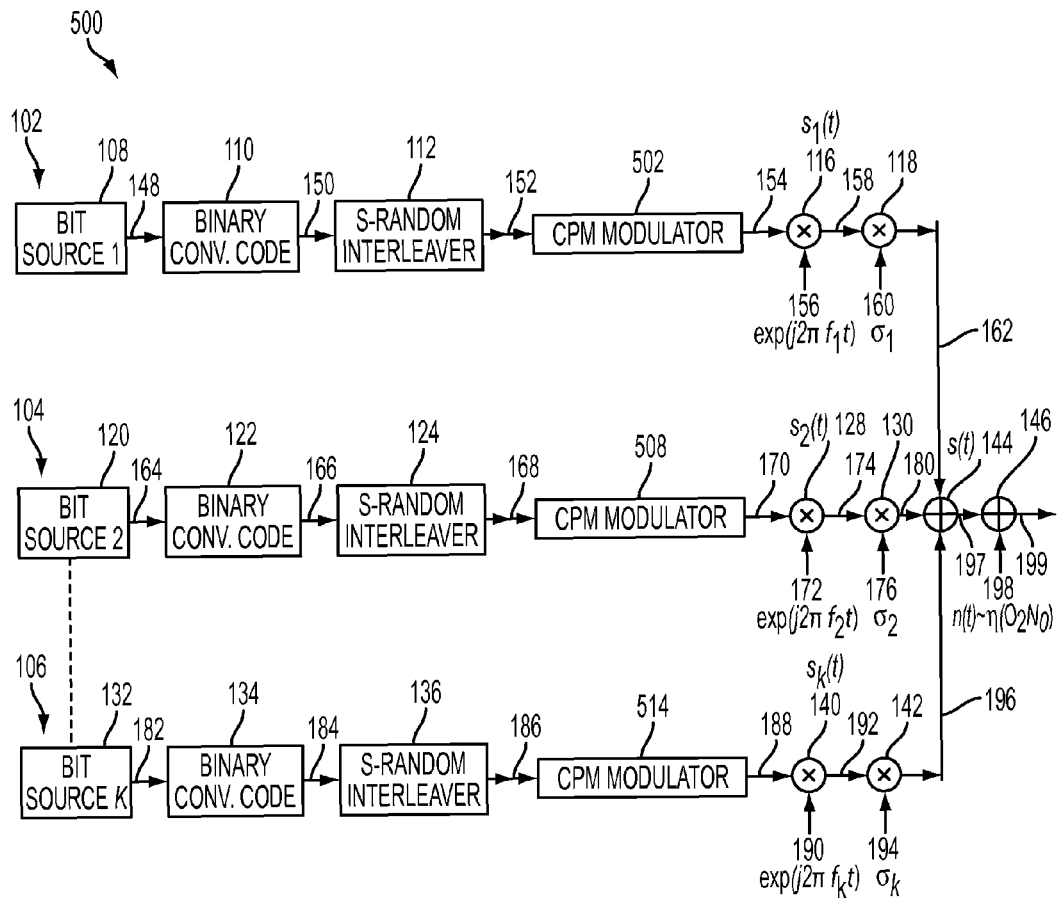
FIG. 5 illustrates an example transmitter and channel for a multi-user system in accordance with an aspect of the present invention.

The transmitter model is shown in FIG. 5 and includes the situation of ACI in which there are K transmitting sources or CPM carriers that are independent and identical.

FIG. 5 illustrates a transmitter 500 and channel for a multi-carrier system in accordance with an aspect of the present invention.

Transmitter 500 replaces selected elements of transmitter 100: replacing CPM modulator 114 with a CPM modulator 502, CPM modulator 126 with a CPM modulator 508, and CPM modulator 138 with a CPM modulator 514.

Operation of transmitter 500 is similar to the operation of transmitter 100 described above except that CPM 502, CPM 508 and CPM 514 operate in accordance with an aspect of the invention. This will be described below in detail.

CPM modulator 502 is operable to receive the data symbols obtained by mapping the scrambled codebits 152 to generate the modulated waveform. CPM signal 154 is provided to mixer 116.

CPM 508 for transmitting source 104 and CPM 514 for transmitting source 106 operate in similar manner as CPM 502. Operation of transmitting source 102 in accordance with an aspect of the present invention will be described in detail for a vector of information bits to be transmitted by bit source 108.

As shown in FIG. 5, for each carrier k, the vector of information data bits signal 148

$$u_k=[u_{k,0},u_{k,1},\ldots,u_{k,N_u-1}]\in\{0,1\}^{N_u}, k=1,2,\ldots,K$$

is passed through binary convolutional encoder 110 to produce the codeword as encoded data bits signal 150 $b'_k\in\{0,1\}^{N_b}$. The code rate is $$R_c=N_u/N_b.$$

$b'_k$, which is bit-interleaved by S-random interleaver 112 to produce the interleaved or scrambled codebits 152 equal to $b_k$.

S-random interleaver 112 ensures that two bits close to each other before interleaving will have a minimum separation of S after interleaving. Hence, if i,j are the indices of two bits at the input to S-random interleaver 112 and i',j' are their indices after interleaving, the S-random interleaver 112 is designed to ensure that if $|i-j|\leq S$ then $|i'-j'|>S$.

The interleaved vector $b_k$ is arranged in a $\log_2 M \times N_a$ matrix B with (l,n) element $B_{l,n}=b_{k,n\log_2 M+l}$. The number of M-ary symbols is $N_a=N_b/\log_2 M$. Each column of B is mapped to one of M symbols to produce the vector:

$$a_k=[a_{k,0},a_{k,1},\ldots,a_{k,Na-1}]\in\{\pm 1,\ldots,\pm(M-1)\}.$$

The symbol sequence is fed to CPM modulator 502.

The modulated CPM signal can be represented using one of many possible methods, such as (but not limited to) Rimoldi's decomposition approach, or in terms of the Laurent decomposition. For purposes of discussion, the CPM signal phase in its most general form can be written as $$\varphi_k(t) = 2\pi h \sum_{i=0}^{n} a_{k,i} q(t - iT)$$

q(t) is the CPM phase pulse/phase response and is a continuous function, such that, $$q(t) = \begin{cases} 0, & t \le 0 \\ 0.5, & t > LT \end{cases}$$

LT=1 for full-response CPM and LT>1 for partial-response CPM. L is the width of the CPM pulse shape.

Baseband CPM signal 188 for the $k^{th}$ carrier can now be written as, $$s_k(t)=e^{j\varphi_k(t)}.$$

CPM signal 188 is frequency translated to its respective slot or center frequency through mixer 116 and multiplier 118. Similarly all CPM signals from their respective transmitting sources are frequency translated to their respective slot or center frequency and are input to adder 144. The composite CPM signal which contains the desired CPM signal and interfering signals 197 out of adder 144 can be described in complex form as $$V_{k,n} = R_p \left[ \sum_{i=0}^{n-L} a_{k,i} \right]$$

Where $f_k$ is the center frequency of the $k^{th}$ carrier, such that, the separation between any two neighboring carriers is given by $$\Delta_f = |f_i - f_j|, \forall |i-j|=1.$$

The spectral efficiency in bits/seconds/Hertz is defined as $$\eta = \frac{R_c \log_2 M}{\Delta_f T}$$

The composite CPM signal 197 is transmitted through a noisy channel such that the signal 199 at its output is given by $$r(t)=s(t)+n(t),$$

where n(t) is AWGN, with single-sided power spectral density of $N_0$ (Watt/Hz).

Output signal 199 of transmitter 500 is received by a receiver 600 as will be discussed with reference to FIG. 6.

Figure 6:
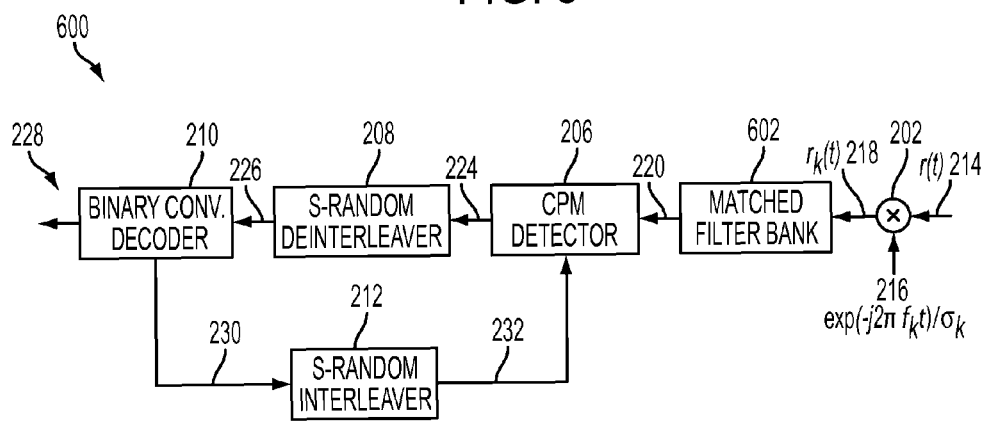
FIG. 6 illustrates an example receiver for a user k of a multi-user system in accordance with an aspect of the invention.

FIG. 6 illustrates a receiver 600 for a carrier k of a multi-carrier system in accordance with an aspect of the invention.

Receiver 600 includes all the elements of receiver 200, except receiver 600 includes matched filter bank 602 in place of matched filter bank 204. Matched filter bank 602 receives signal 218 from mixer 202 and provides signal 220 to CPM detector 206. Matched filter bank 602 is operable in accordance with an aspect of the invention, which will be described in detail below.

Receiver model 600 as shown in FIG. 6 assumes perfect timing recovery and carrier phase synchronization. Additionally, no information is exchanged with the adjacent carriers' receivers. Receiver 600 treats the ACI as zero-mean AWGN with single-sided PSD of $N_1$. Accordingly, the signal model at receiver 600 is obtained by combining the interference and the channel noise into a single AWGN term n'(t) which is zero-mean, with single-sided power spectral density $N'=(N_0+N_1)$, such that $$r(t)=s_k(t)+n'(t).$$

As shown in FIG. 6, matched filter bank 602 followed by soft-in/soft-out (SISO) CPM detector 206 make up baseband CPM demodulator (not shown). Output signal 220 of, matched filter bank 602 is fed to CPM detector 206, which generates the maximum a posteriori (MAP) probabilities for the transmitted codebits by executing the well known BCJR algorithm on a trellis describing the modulation.

CPM detector 206 generates maximum a posteriori probabilities of the transmitted codebits, which when expressed as log-likelihood ratios can be written as $$Z_{l,n} = \log \frac{P[B_{l,n} = 1 \mid r_k(t)]}{P[B_{l,n} = 0 \mid r_k(t)]}$$
$$= \log \frac{\sum_{S^{(1)}} \exp(\alpha_n(s') + \gamma_{n+1}(s',s) + \beta_{n+1}(s))}{\sum_{S^{(0)}} \exp(\alpha_n(s') + \gamma_{n+1}(s',s) + \beta_{n+1}(s))}$$

Where $S^{(1)}$ is the set of state transitions $\{S_n=s'\} \to \{S_{n+1}=s\}$ corresponding to $B_{l,n}=1$, $S^{(0)}$ is similarly defined for $B_{l,n}=0$, and the sub-script k has been dropped from the LLR without loss of generality.

Since it is known in the art how to recursively calculate $\alpha$ and $\beta$ from the branch metric $\gamma$, to complete the description of CPM demodulator, the equation for derivation of $\gamma$ is shown below.

Branch-metric $\gamma_{n+1}(s',s)$ is known to be defined as $$\gamma_{n+l}(s', s) = \log P[S_{n+l} = s, r_k(t) \mid S_n = s']$$
$$= \log P[S_{n+l} = s \mid S_n = s'] +$$
$$\log P[r_k(t) \mid (S_n \to S_{n+l}) = (s' \to s)]$$

log $P[S_{n+1}=s|S_n=s']$ is initially set to 0. Since receiver 600 iterates between CPM detector 206 and binary convolutional decoder 210, the soft-information obtained from binary convolutional decoder 210 during iterations is used to update the value of $P[S_{n+1}=s|S_n=s']$ as a priori information. Such an iterative detection and decoding scheme when applied to CPM is called as serially concatenated CPM or bit-interleaved coded CPM with iterative decoding.

The LLRs $Z_{l,n}$ generated for each codebit $b_l$ within $a_n$ are arranged into a row vector z such that $z_{n\log_2 M+l}=Z_{l,n}$. The vector is de-interleaved, the a priori input to CPM detector 206 subtracted, and the resulting extrinsic information sequence z' is fed to binary convolutional decoder 210. Binary convolutional decoder 210 in turn utilizes z' as a priori information and generates extrinsic information on the codebits υ' also using the BCJR algorithm. υ' after interleaving is used to compute the probabilities $P[S_{n+1}=s|S_n=s']$ required by CPM detector 206. After maximum number of iterations between CPM detector 206 and binary convolutional decoder 210, binary convolutional decoder 210 produces hard decisions on the information bits.

The operation of a transmitting source, which involved encoding, scrambling and modulation of a bit source for transmission via a channel of a multi-carrier system was discussed in accordance with an aspect of the invention with respect to FIG. 5. The operation of a receiver, which involved matched filtering, descrambling and decoding of the received bit source from the channel of the multi-carrier system to recover the original bit source in accordance with an aspect of the invention, was discussed with respect to FIG. 6.

A new family of CPM pulse shapes derived from CPM modulator and demodulator as shown in FIGS. 5-6 in accordance with an aspect of the invention will now be described further with reference to FIGS. 7-12.

FIGS. 7-12 illustrate the phase pulse of the new pulse shapes proposed in accordance with an aspect of the present invention, which are derived from conventional RC and REC pulses. This will be described in detail below.

The phase response $q_{RC}(t)$ of the RC pulse shape $g_{RC}(t)$ is given by:

$$q_{RC}(t) = \int_0^t g_{RC}(\tau)d\tau$$

where, $$g_{RC}(t) = \begin{cases} \frac{1}{2LT}\left(1 - \cos\frac{2\pi t}{LT}\right), & 0 \leq t \leq LT \\ 0, & \text{otherwise} \end{cases}$$

REC pulse $q_{RE}(t)$ is obtained by integrating $g_{RE}(t)$, $$q_{RE}(t) = \int_0^t g_{RE}(\tau)d\tau$$

where:

$$g_{RE}(t) = \begin{cases} \frac{1}{2LT}, & 0 \leq t \leq LT \\ 0, & \text{otherwise.} \end{cases}$$

The new phase pulse AV, which is a weighted average of $q_{RC}(t)$ and $q_{RE}(t)$ is derived as follows:

$$q_{AV}(t) = \alpha_{RE} \times q_{RE}(t) + \alpha_{RC} \times q_{RC}(t)$$

where $\alpha_{RE}$ and $\alpha_{RC}$ are selected to ensure that $q_{AV}(t)$ is continuous, monotonous between $0 \leq t \leq LT$, such that $$q_{AV}(t) = \begin{cases} 0, & t \leq 0 \\ 0.5, & t > LT. \end{cases}$$

Graphs of $q_{AV}(t)$ for different values of $\alpha_{RE}$ and $\alpha_{RC}$ and the resulting PSDs in accordance with an aspect of the present invention are shown using FIGS. 7-12.

Figure 7:
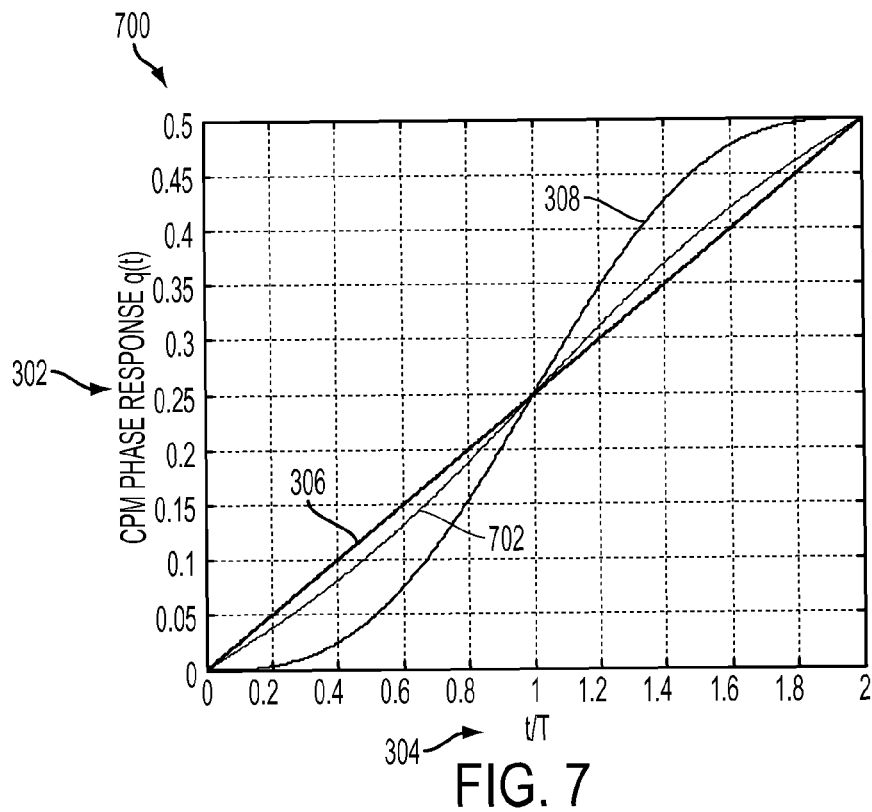
FIG. 7 is a graph of a CPM phase response with t/T for $\alpha_{RE}=0.75$ and $\alpha_{RC}=0.25$, in accordance with an aspect of the invention.

FIG. 7 illustrates a graph 700 for CPM phase response with t/T for $\alpha_{RE}=0.75$ and $\alpha_{RC}=0.25$, in accordance with an aspect of the invention.

As illustrated in the figure, y-axis 302 represents CPM phase response and x-axis 304 represents time normalized by symbol duration or time multiplied by symbol rate (t/T). CPM phase response is represented by a function q(t). Graph 700 includes curve 306, curve 308 and a curve 702.

Curve 306 represents the phase response $q_{RE}(t)$ for a REC pulse. Curve 308 represents the phase response $q_{RC}(t)$ for a RC pulse. Curve 702 represents the phase response $q_{AV}(t)$ for pulse shape AV. For FIG. 7, coefficients $\alpha_{RE}=0.75$ and $\alpha_{RC}=0.25$, assuming L=2.

As is obvious from FIG. 7, CPM phase response for pulse shape AV lies in between the phase responses for REC and RC pulses. Resulting PSDs for these phase responses are shown in FIG. 8.

Figure 8:
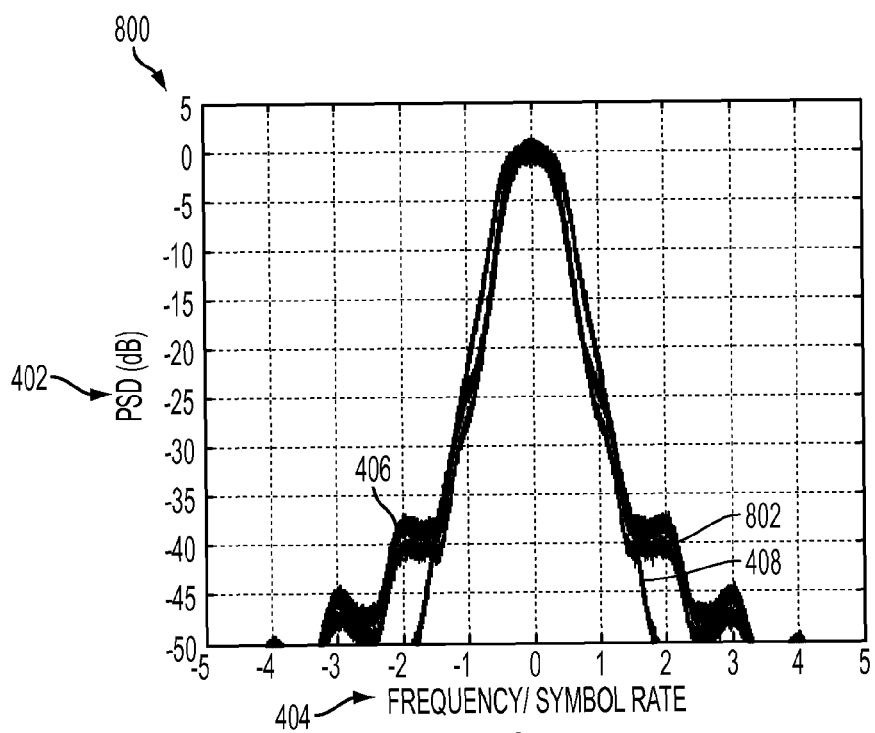
FIG. 8 is a graph of a PSD with frequency/symbol rate for $\alpha_{RE}=0.75$ and $\alpha_{RC}=0.25$, in accordance with an aspect of the invention.

FIG. 8 illustrates a graph 800 for PSD with frequency/symbol rate for $\alpha_{RE}=0.75$ and $\alpha_{RC}=0.25$, in accordance with an aspect of the invention.

As illustrated in the figure, y-axis 402 represents PSD in dB and x-axis 404 represents frequency/symbol rate. Graph 800 includes curve 406, curve 408 and a curve 802. PSDs shown in graph 800 are for alphabet size M=4, and modulation index h=1/3. Curve 406 represents PSD for a CPM signal modulated using REC pulse and curve 408 represents PSD for a CPM signal modulated using RC pulse. Curve 802 represents the PSD for CPM signal modulated using pulse shape AV.

As shown by curve 406, PSD obtained for a REC pulse has a narrower main lobe and wider side lobes. In contrast, as shown by curve 408, PSD obtained for a CPM signal modulated using RC pulse has a wider main lobe but smaller side lobes. However, as shown by curve 802, PSD obtained for AV pulse, which is a function of the REC and RC pulses, has a narrower main lobe and smaller side lobes as compared to RC and REC pulses, respectively. Having a narrow main lobe and rapidly decaying side lobes as shown by AV pulse, allows the carriers in a channel packed efficiently while minimizing the effect of interference with the neighboring carriers. CPM phase response and PSD value for different values of $\alpha_{RE}$ and $\alpha_{RC}$ are shown in FIGS. 9-10.

Figure 9:
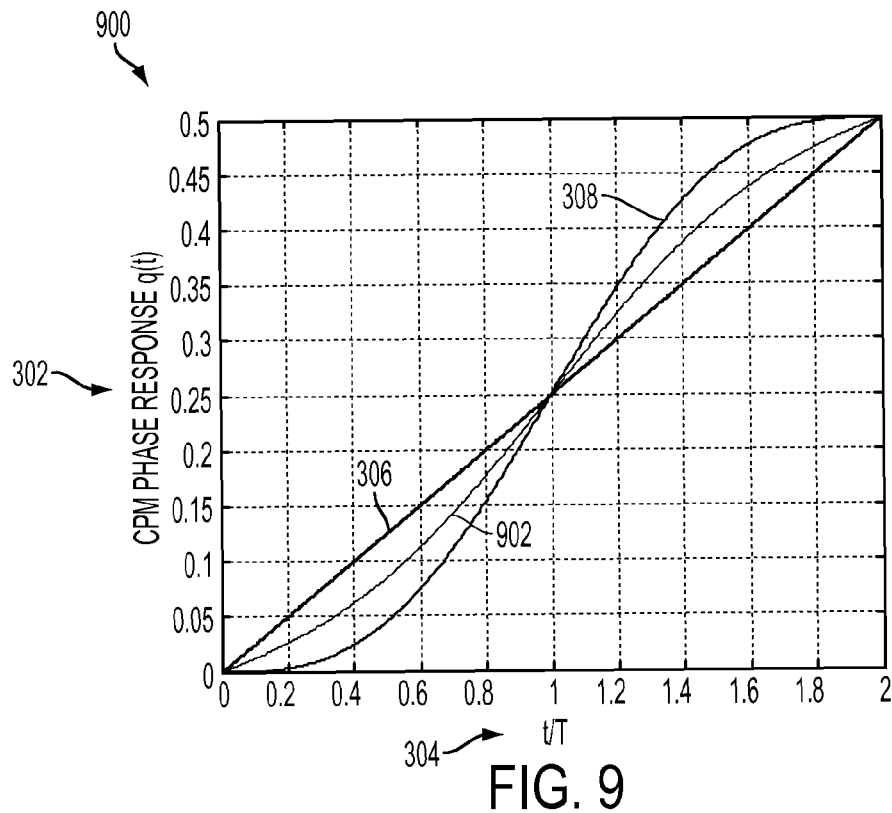
FIG. 9 is a graph of a CPM phase response with t/T for $\alpha_{RE}=0.5$ and $\alpha_{RC}=0.5$, in accordance with an aspect of the invention.
Figure 10:
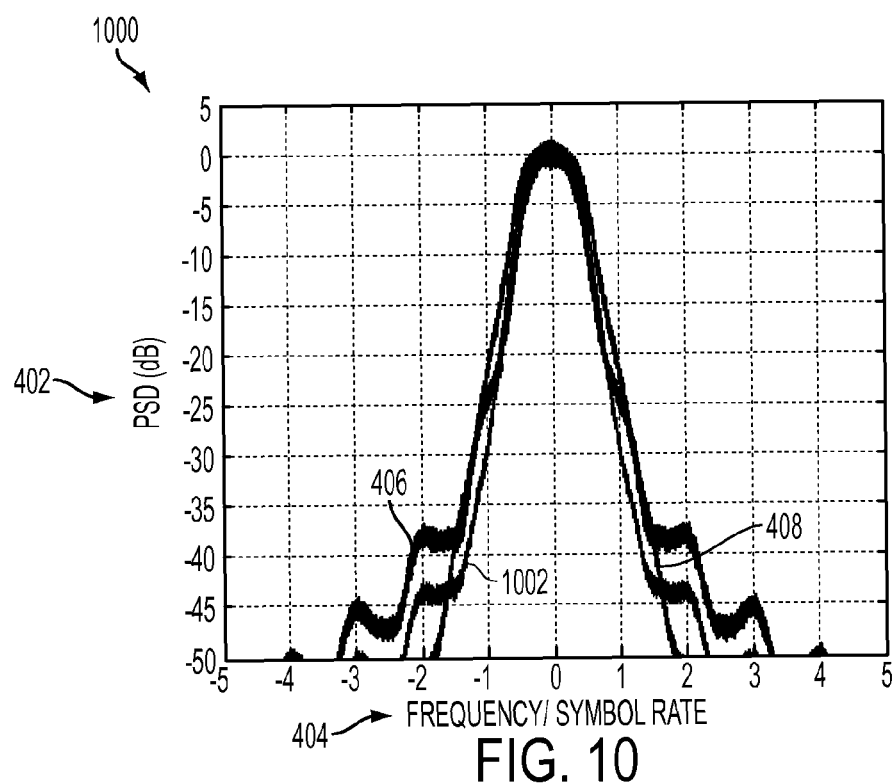
FIG. 10 is a graph of a PSD with frequency/symbol rate for $\alpha_{RE}=0.5$ and $\alpha_{RC}=0.5$, in accordance with an aspect of the invention.

FIG. 9 illustrates a graph 900 for CPM phase response with t/T for $\alpha_{RE}=0.5$ and $\alpha_{RC}=0.5$, in accordance with an aspect of the invention.

As illustrated in the figure, y-axis 302 represents CPM phase response in degrees and x-axis 304 represents time normalized by symbol duration or time multiplied by symbol rate (t/T). CPM phase response is represented by a function q(t). Graph 900 includes curve 306, curve 308 and a curve 902.

Curve 306 represents the phase response $q_{RE}(t)$ for a REC pulse. Curve 308 represents the phase response $q_{RC}(t)$ for a RC pulse. Curve 902 represents the phase response $q_{AV}(t)$ for pulse shape AV. For FIG. 9, coefficients $\alpha_{RE}=0.5$ and $\alpha_{RC}=0.5$, assuming L=2.

As is obvious from FIG. 9, CPM phase response for pulse shape AV lies in between the phase responses for REC and RC pulses. Resulting PSDs for these phase responses are shown in FIG. 10.

FIG. 10 illustrates a graph 1000 for PSD with frequency/symbol rate for $\alpha_{RE}=0.5$ and $\alpha_{RC}=0.5$, in accordance with an aspect of the invention.

As illustrated in the figure, y-axis 402 represents PSD in dB and x-axis 404 represents frequency/symbol rate. Graph 1000 includes curve 406, curve 408 and a curve 1002. PSDs shown in graph 1000 are for alphabet size M=4, and modulation index h=1/3. Curve 406 represents PSD for a CPM signal modulated using REC pulse and curve 408 represents PSD for a CPM signal modulated using RC pulse. Curve 1002 represents the PSD for CPM signal modulated using the pulse shape AV.

As shown by curve 406, PSD obtained for a REC pulse has a narrower main lobe and more pronounced side lobes. In contrast, as shown by curve 408, PSD obtained for a RC pulse has a wider main lobe and rapidly decaying side lobes. However, as shown by curve 1002, PSD obtained for pulse shape AV, which is a function of the REC and RC pulses, has a narrower main lobe and smaller side lobes as compared to RC and REC pulses, respectively. Having a narrow main lobe and rapidly decaying side lobes as shown by pulse shape AV, allows the carriers in a channel packed efficiently while minimizing the effect of interference with the neighboring carriers. CPM phase response and PSD value for different values of $\alpha_{RE}$ and $\alpha_{RC}$ are shown in FIGS. 11-12.

Figure 11:
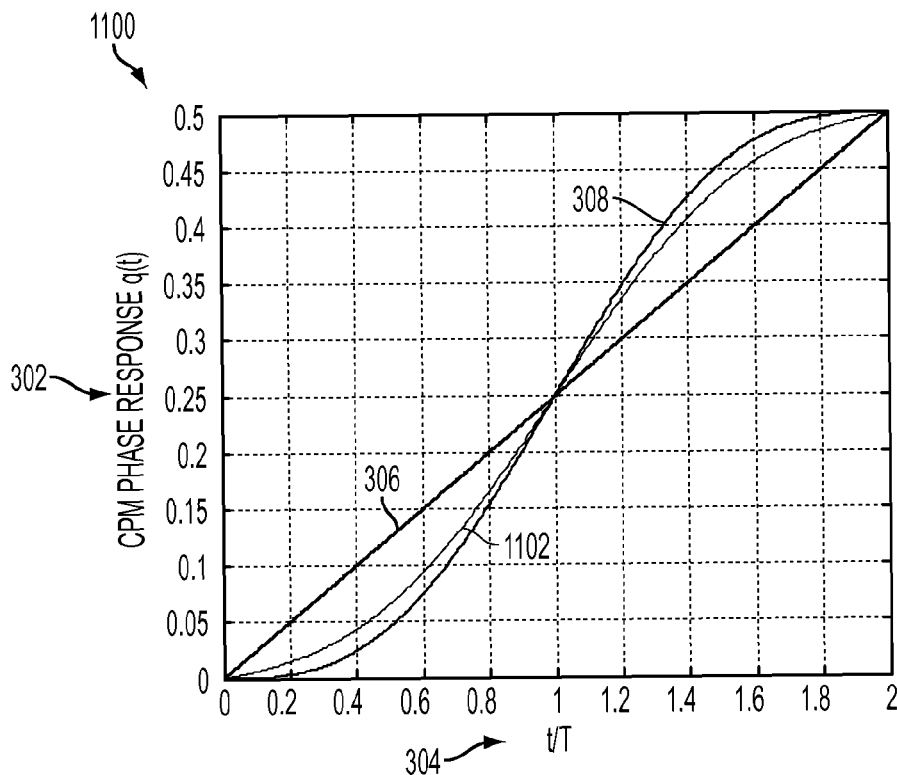
FIG. 11—is a graph of a CPM phase response with t/T for $\alpha_{RE}=0.25$ and $\alpha_{RC}=0.75$, in accordance with an aspect of the invention.
Figure 12:
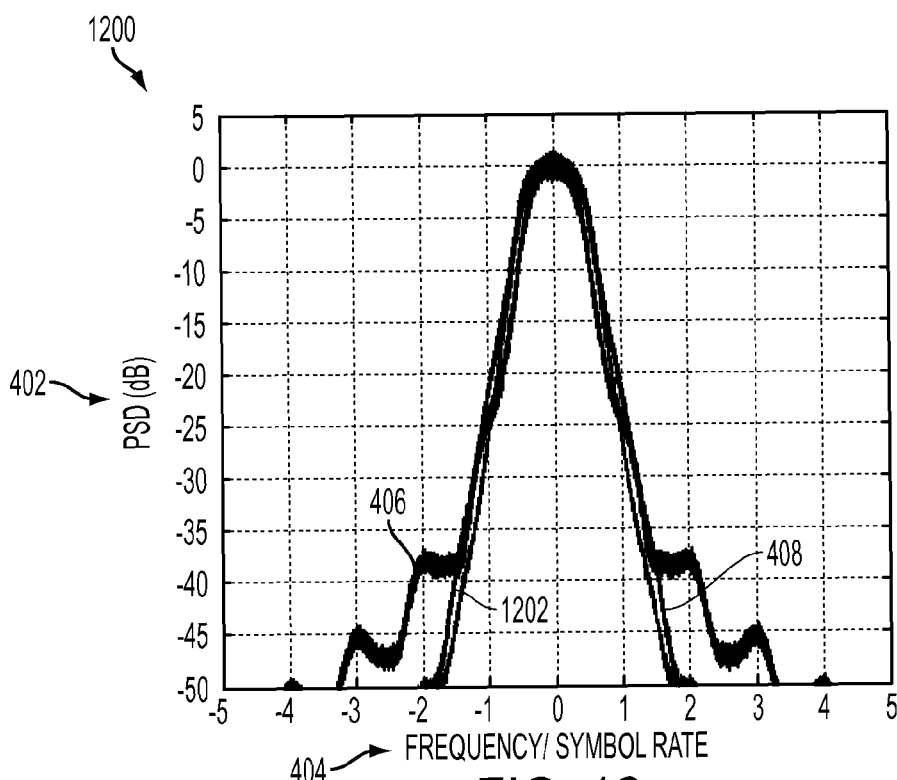
FIG. 12—is a graph of a PSD with frequency/symbol rate for $\alpha_{RE}=0.25$ and $\alpha_{RC}=0.75$, in accordance with an aspect of the invention.

FIG. 11 illustrates a graph 1100 for CPM phase response with t/T for $\alpha_{RE}$=0.25 and $\alpha_{RC}$=0.75, in accordance with an aspect of the invention.

As illustrated in the figure, y-axis 302 represents CPM phase response in degrees and x-axis 304 represents time normalized by symbol duration or time multiplied by symbol rate (t/T). CPM phase response is represented by a function q(t). Graph 1100 includes curve 306, a curve 308 and a curve 1102.

Curve 306 represents the phase response $q_{RE}(t)$ for a REC pulse. Curve 308 represents the phase response $q_{RC}(t)$ for a RC pulse. Curve 1102 represents the phase response $q_{AV}(t)$ for pulse shape AV. For FIG. 11, coefficients $\alpha_{RE}$=0.25 and $\alpha_{RC}$=0.75, assuming L=2.

As is obvious from FIG. 11, CPM phase response for pulse shape AV lies in between the phase responses for REC and RC pulses. Resulting PSDs for these phase responses are shown in FIG. 12.

FIG. 12 illustrates a graph 1200 for PSD with frequency/symbol rate for $\alpha_{RE}$=0.25 and $\alpha_{RC}$=0.75, in accordance with an aspect of the invention.

As illustrated in the figure, y-axis 402 represents PSD in dB and x-axis 404 represents frequency/symbol rate. Graph 1200 includes curve 406, curve 408 and a curve 1202. PSDs shown in graph 1200 are for alphabet size M=4, and modulation index h=1/3. Curve 406 represents PSD for a CPM signal modulated using REC pulse and curve 408 represents PSD for a CPM signal modulated using RC pulse. Curve 1202 represents the PSD for CPM signal modulated using pulse shape AV.

As shown by curve 406, PSD obtained for a REC pulse has a narrower main lobe and more pronounced side lobes. In contrast, as shown by curve 408, PSD obtained for a RC pulse has a wider main lobe and rapidly decaying side lobes. However, as shown by curve 1202, PSD obtained for AV pulse, which is a function of the REC and RC pulses, has a narrower main lobe and smaller side lobes as compared to RC and REC pulses, respectively. Having a narrow main lobe and small side lobes as shown by AV pulse, allows the carriers in a channel packed efficiently while minimizing the effect of interference with the neighboring carriers.

It is clear from FIG. 7-12 that as $\alpha_{RE}$ increases, the PSD main lobe becomes narrower and more power is transferred to the side lobes of the PSD. Conversely, as $\alpha_{RC}$ increases, the power in the spectrum is transferred from the side lobes to the main lobe, because of which the PSD exhibits a wider main lobe, but very small side lobes. Similar trends are also observed at different values of M, h and L. In summary, by choosing the parameters $\alpha_{RC}$ and $\alpha_{RE}$, a CPM signal using the AV pulse shape can provide a power spectrum that has a narrower main lobe and smaller side lobes than its RC and REC counterparts. This ability to shape the power spectrum becomes especially useful when high spectral efficiencies are desired.

The methodology for computing the symmetric information rate for CPM is known in the literature. Here, this methodology is applied to analyze and compare the performance of the AV pulse shapes, in accordance with an aspect of the present invention with the well known RC and REC pulses.

Figure 13:
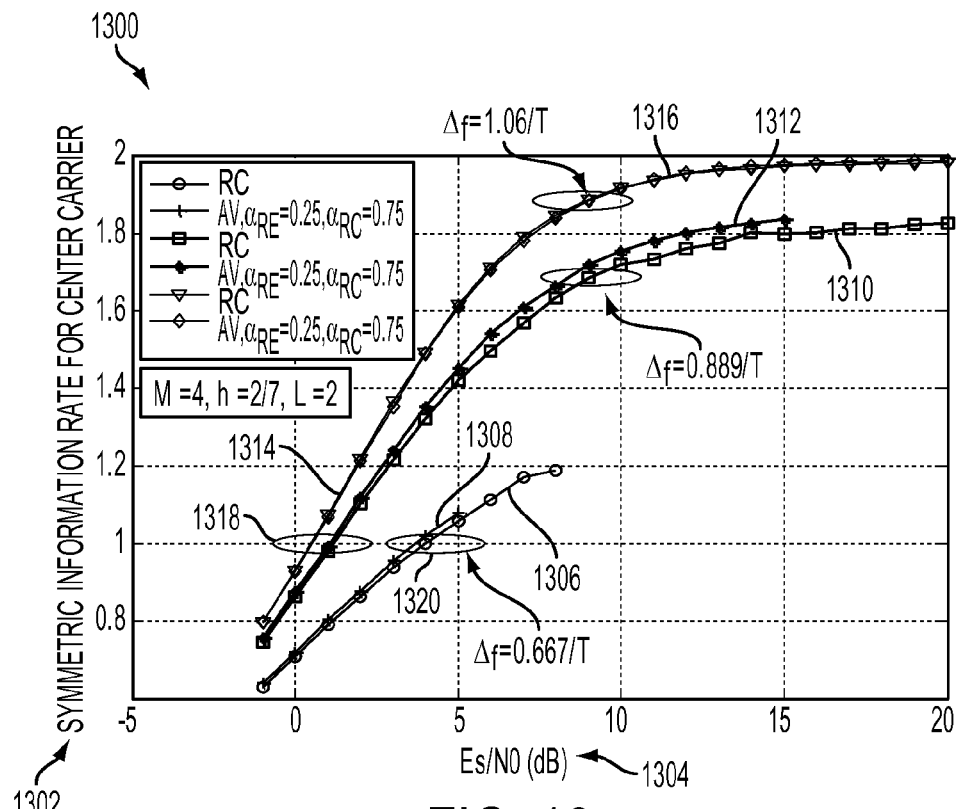
FIG. 13 is a graph of a symmetric information rate as a function of signal to noise ratio $E_s/N_0$ in a multi-user transmission.

Symmetric information rate (or the capacity) of the center carrier in the presence of ACI is shown using FIG. 13.

FIG. 13 illustrates a graph 1300 for symmetric information rate as a function of signal to noise ratio $E_s/N_0$ in a multi-carrier transmission.

As illustrated in the figure, a y-axis 1302 represents symmetric information rate in bits/symbol and an x-axis 1304 represents $E_s/N_0$ in dB. Graph 1300 includes a curve 1306, a curve 1308, a curve 1310, a curve 1312, a curve 1314 and a curve 1316 and an area 1318, an area 1320 and an area 1322. Graph 1300 represents symmetric information rate of a CPM signal modulated using the pulse shapes AV, in accordance with an aspect of the present invention, and raised cosine pulse shape RC, with different carrier spacing. The desired carrier is transmitted through an AWGN channel together with two interfering carriers whose signal powers vary uniformly and randomly within ±1.5 dB of desired signal's power. As discussed earlier, function $q_{AV}$ for pulse shape AV is given by: $q_{AV}(t)=\alpha_{RE}q_{RE}(t)+\alpha_{RC}q_{RC}(t)$, where, $\alpha_{RE}$=0.25 and $\alpha_{RC}$=0.75. Modulation parameters are set to M=4, L=2, and h=2/7. Graph 1300 also shows the effect on the capacity of reducing the carrier spacing $\Delta_f$.

As shown in the figure: curve 1306 represents the symmetric information rate of a CPM signal modulated using the phase pulse shape RC when the carrier spacing is $\Delta_f$=0.667/T; curve 1308 represents the symmetric information rate of a CPM signal modulated using the phase pulse shape AV when the carrier spacing is $\Delta_f$=0.667/T; curve 1310 represents the symmetric information rate of a CPM signal modulated using the phase pulse shape RC when the carrier spacing is $\Delta_f$=0.889/T; curve 1312 represents the symmetric information rate of a CPM signal modulated using the phase pulse shape AV when the carrier spacing is $\Delta_f$=0.889/T; curve 1314 represents the symmetric information rate of a CPM signal modulated using the phase pulse shape RC when the carrier spacing is $\Delta_f$=1.06/T; and curve 1316 represents the symmetric information rate of a CPM signal modulated using the phase pulse shape AV when the carrier spacing is $\Delta_f$=1.06/T.

In the figure, the $E_s/N_0$ represents the information-theoretic minimum signal to noise ratio required for reliable signaling at some target information rate. The information theoretic minimum per-information bit SNR ($E_b/N_0$) can also be determined as $E_b/N_0=E_s/N_0$/symmetric information rate. The minimum $E_b/N_0$ required for a desired information rate depends on the choice of the CPM parameters and the carrier spacing.

As can be seen from FIG. 13, a higher SNR is required to achieve the same information rate due to the increased ACI as the carriers are packed closer. For example, when using AV pulse shape in accordance with an aspect of the present invention, the Es/N0 required for a symmetric information rate of 1 bit/symbol increases from 0.48 dB when $\Delta_f$=1.06/T, as seen at area 1318, to 3.68 dB when $\Delta_f$=0.667/T, as seen at area 1320.

Figure 14:
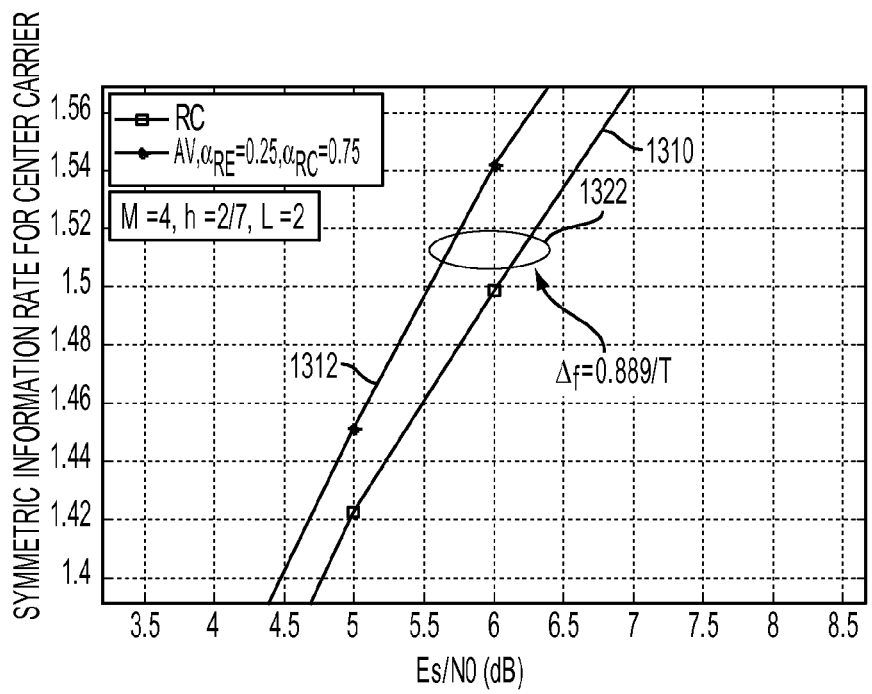
FIG. 14 is a graph of a symmetric information rate as a function of signal to noise ratio $E_s/N_0$ in a multi-user transmission.

FIG. 14 illustrates exploded portion of graph 1300 around area 1322.

FIGS. 13 and 14 also provide a performance comparison between the RC pulse shape and the AV pulse shape in accordance with an aspect of the present invention. By comparing FIG. 13 and FIG. 14, it is clear that the AV pulse shape outperforms the RC pulse shape at higher spectral efficiencies (i.e. when the carrier spacing is reduced). For example, it is seen in FIG. 14 that at an information rate of 1.5 bits/symbol, the RC pulse shape requires 0.5 dB more SNR than the AV pulse in accordance with an aspect of the present invention. Similarly, one can also conclude that for a fixed $E_s/N_0$, the AV pulse shape provides a higher capacity than the RC pulse shape, at tighter carrier spacing. For example, FIG. 14 reveals that at $E_s/N_0=6$ dB, the achievable symmetric information rate is 1.5 bits/symbol for the RC pulse shape and 1.54 bits/symbol for the AV pulse shape. Additionally, FIG. 13 indicates that even when the carrier spacing is increased (i.e. the spectral efficiency is reduced), the AV pulse shape is seen to have comparable performance to the RC pulse shape.

A more extensive capacity based comparison between the AV in accordance with an aspect of the present invention, RC and REC pulse shapes is presented in Table I at different carrier spacing and spectral efficiencies.

Table I provides a theoretical minimum $E_b/N_0$ for CPM modulations using the AV, REC and REC pulse shapes at 1.5 b/s/Hz, 1.33 b/s/Hz and 1.1 b/s/Hz. Two different values of $\Delta_f$ are considered at each spectral efficiency. It is assumed that the desired carrier is transmitted through an AWGN channel together with two interfering carriers whose signal powers vary uniformly and randomly within ±1.5 dB of desired signal's power. The alphabet size is M=4.

phase pulse. Curve 1508 represents FER for center carrier for RC phase pulse. Curve 1510 represents FER for center carrier for pulse shape AV.

Figure 15:
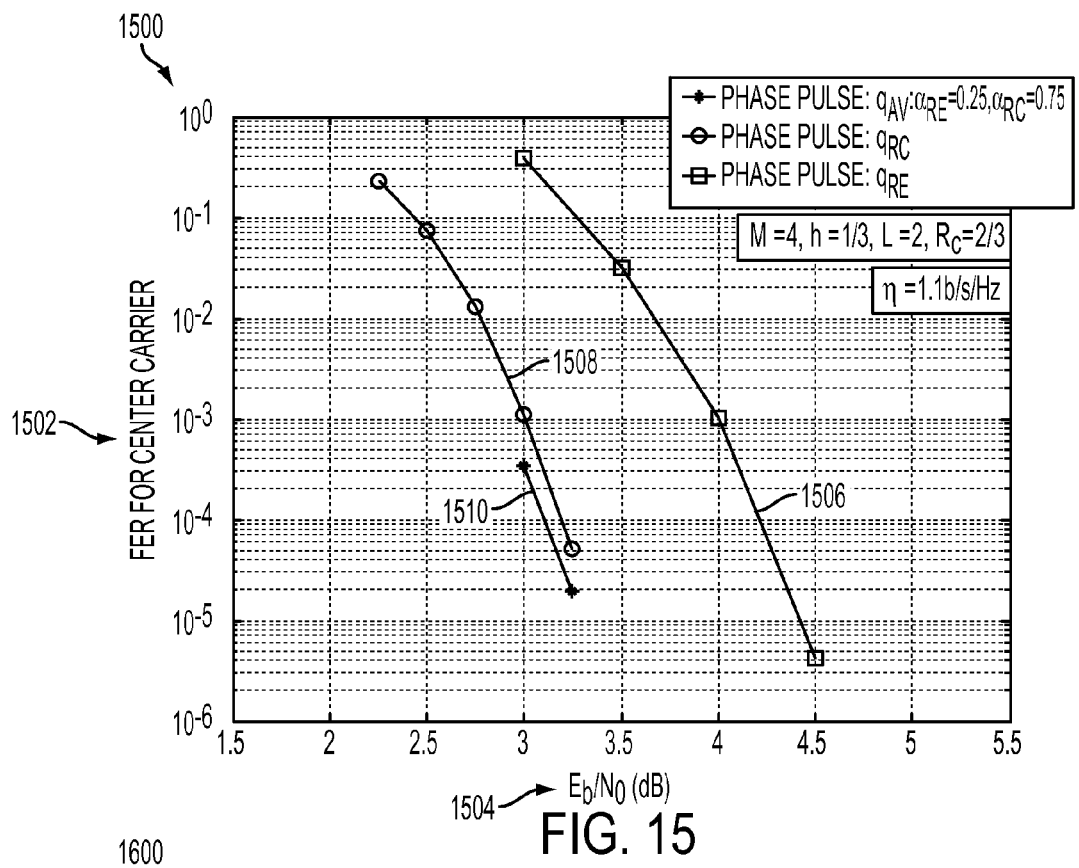
FIG. 15 is a graph of a FER for center carrier as a function of $E_b/N_0$, for $\eta$ of 1.1 b/s/Hz, in accordance with an aspect of the invention.

FIG. 15 shows FER curves using a 4-state binary convolutional code (generator polynomials $(5,7)_{octal}$). An S-random bit-interleaver of length $N_b=1443$ bits is used at the output of a binary convolution coder. A total of 30 iterations are performed between a CPM detector and a binary convolutional decoder. The simulation model assumes that the desired carrier is detected in the presence of four interfering carriers (two on either side) whose power levels vary uniformly and randomly within ±1.5 dB of the center carrier's power.

FIG. 15 shows FER curves at η of 1.1 b/s/Hz using M=4, L=2 and h=1/3 for AV, RC and REC pulses. The code rate is $R_c=2/3$. For the same receiver complexity, pulse shape AV as shown by curve 1510 is 0.1 dB better than RC phase pulse as shown by curve 1508. Similarly, pulse shape AV as shown by curve 1510 is 1.2 dB better than REC phase pulse as shown by curve 1506. FER curves for all three pulses at η of 1.5 b/s/Hz are shown in FIG. 16.

Figure 16:
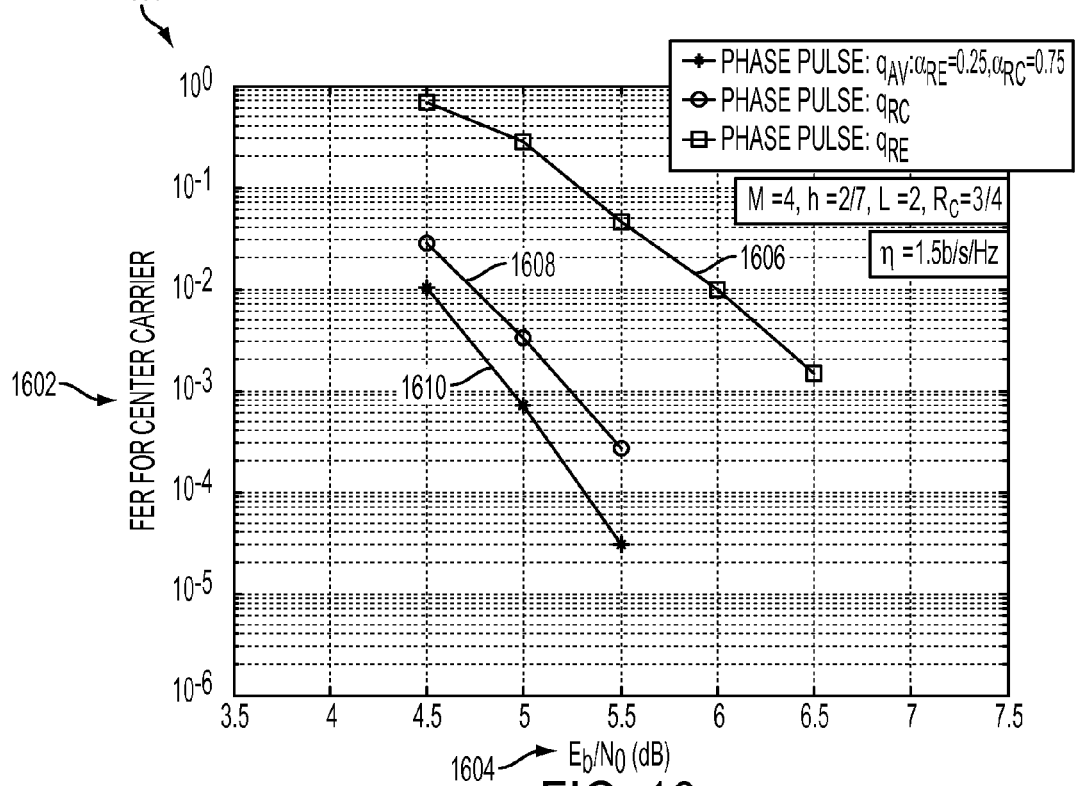
FIG. 16 is a graph of a FER for center carrier as a function of $E_b/N_0$, for $\eta$ of 1.5 b/s/Hz, in accordance with an aspect of the invention.

FIG. 16 illustrates a graph 1600 for a laboratory simulated FER for center carrier with $E_b/N_0$, for η of 1.5 b/s/Hz, for pulse shape AV in comparison with REC and RC phase pulses, in accordance with an aspect of the invention.

As illustrated in the figure, a y-axis 1602 represents FER for center carrier and an x-axis 1604 represents $E_b/N_0$ in dB. Graph 1600 includes a curve 1606, a curve 1608 and a curve 1610. Curve 1606 represents FER for center carrier for REC phase pulse. Curve 1608 represents FER for center carrier for RC phase pulse. Curve 1610 represents FER for center carrier for pulse shape AV.

TABLE I

| | | 1.5 b/s/Hz | | 1.33 b/s/Hz | | 1.1 b/s/Hz | |
|---|---|---|---|---|---|---|---|
| Pulse shape | h | $\Delta_f=0.667/T$ $E_b/N_0$ | $\Delta_f=0.889/T$ $E_b/N_0$ | $\Delta_f=1/T$ $E_b/N_0$ | $\Delta_f=1.125/T$ $E_b/N_0$ | $\Delta_f=0.91/T$ $E_b/N_0$ | $\Delta_f=1.21/T$ $E_b/N_0$ |
| AV | 1/5 | 3.0 | | | | 1.56 | |
| $\alpha_{RE}=0.25$ | 1/4 | 3.2 | 2.652 | 2.11 | 2.66 | 1.01 | 1.81 |
| $\alpha_{RC}=0.75$ | 2/7 | 3.68 | 2.57 | 1.79 | 2.036 | 0.923 | 1.27 |
| | 1/3 | 4.62 | 3.32 | 1.85 | 2.08 | 1.22 | 1.14 |
| | 2/5 | | | 2.8 | 2.38 | | 1.16 |
| RC | 1/5 | 3.06 | 3.31 | 2.85 | | | |
| | 1/4 | 3.41 | 2.71 | 2.04 | 2.487 | 1.1 | 1.62 |
| | 2/7 | 4.0 | 2.85 | 1.828 | 1.957 | 1.03 | 1.16 |
| | 1/3 | 4.93 | 3.85 | 2.08 | 2.225 | 1.4266 | 1.21 |
| REC | 2/7 | | | 2.28 | | | |
| | 1/3 | | | 1.97 | 2.47 | | 1.557 |
| | 2/5 | | | 2.22 | 2.2 | | 1.18 |

It is clear from Tables I, the pulse shape AV in accordance with an aspect of the invention can provide a lower minimum $E_b/N_0$ than RC and REC phase pulses, especially at the higher spectral efficiencies. Even when $\Delta_f$ is increased, the pulse shape AV in accordance with an aspect of the invention can provide a comparable, if not better minimum $E_b/N_0$ than its RC and REC counter parts at a desired spectral efficiency.

Next, the frame error rate (FER) performance of the pulse shapes is evaluated for finite interleaver lengths. This is explained in detail further using FIGS. 15-17.

FIG. 15 illustrates a graph 1500 for a laboratory simulated FER for center carrier as a function of $E_b/N_0$, for η of 1.1 b/s/Hz, for pulse shape AV in comparison with REC and RC phase pulses, in accordance with an aspect of the invention.

As illustrated in the figure, a y-axis 1502 represents FER for center carrier and an x-axis 1504 represents $E_b/N_0$ in dB. Graph 1500 includes a curve 1506, a curve 1508 and a curve 1510. Curve 1506 represents FER for center carrier for REC FIG. 16 shows FER curves at 1.5 b/s/Hz using M=4, L=2 and h=2/7 for AV, RC and REC pulses. The code rate is $R_c=3/4$. For the same receiver complexity, the AV phase pulse as shown by curve 1610 is 0.35 dB better than RC phase pulse as shown by curve 1608. Similarly, pulse shape AV as shown by curve 1610 is 1.5 dB better than REC phase pulse as shown by curve 1606. It is interesting to note that the AV pulse shape provides a 4 dB reduction in PSD main lobe relative to the RC pulse shape and 10 dB reduction in the side lobes relative to REC pulse shape for the same value of M=4, L=2 and h=2/7.

Figure 17:
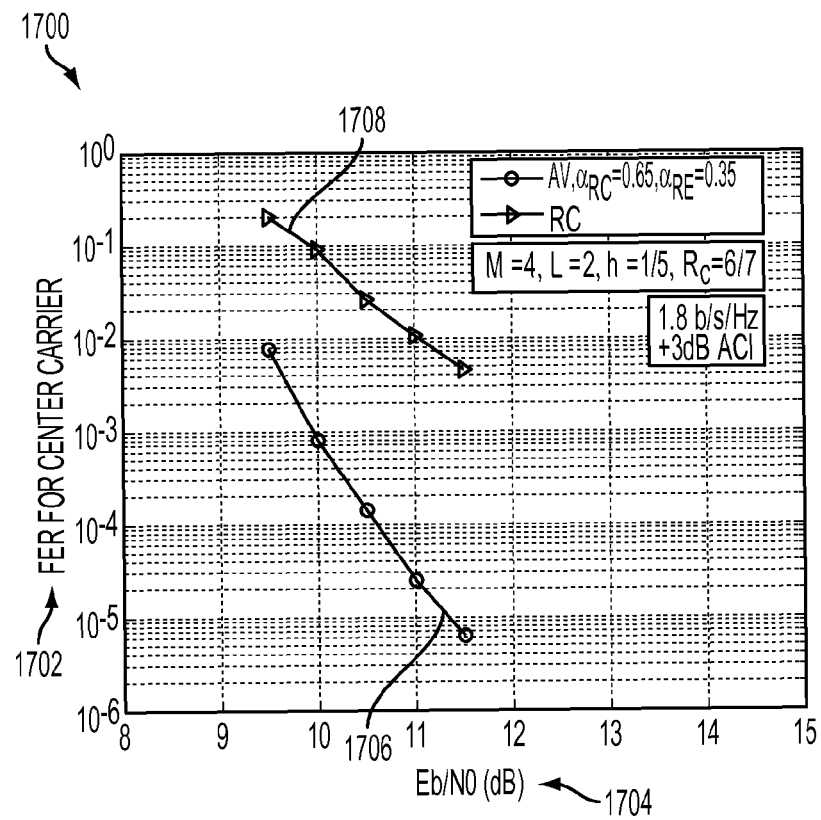
FIG. 17 is a graph of a FER for center carrier as a function of $E_b/N_0$, for $\eta$ of 1.8 b/s/Hz, in accordance with an aspect of the invention.

FIG. 17 illustrates a graph 1700 for a laboratory simulated FER for center carrier as a function of $E_b/N_0$, for η of 1.8 b/s/Hz, for pulse shape AV in comparison with REC and RC phase pulses, in accordance with an aspect of the invention.

As illustrated in the figure, a y-axis 1702 represents FER for center carrier and an x-axis 1704 represents $E_b/N_0$ in dB. Graph 1700 includes a curve 1706 and a curve 1708. Curve 1708 represents FER for center carrier for RC phase pulse.

Curve 1710 represents FER for center carrier for pulse shape AV, when $\alpha_{RC}$=0.65 and $\alpha_{RE}$=0.35.

FIG. 17 shows FER curves using a 8-state binary convolutional code (generator polynomials $(15,17)_{octal}$). An S-random bit-interleaver of length $N_b$=1754 bits is used at the output of a binary convolution coder. A total of 30 iterations are performed between a CPM detector and a binary convolutional decoder. The simulation model assumes that the desired carrier is detected in the presence of four interfering carriers (two on either side) whose power levels are 3 dB higher than the center carrier's power.

FIG. 17 shows FER curves at η of 1.8 b/s/Hz using M=4, L=2 and h=1/5 for AV, and RC. The code rate is $R_c$=6/7. For the same receiver complexity, pulse shape AV as shown by curve 1706 is 2 dB better than RC phase pulse as shown by curve 1708.

As shown by FIGS. 15-17, for higher spectral efficiency, FER performance gap of pulse shape AV as compared to RC and REC phase pulses increases.

As discussed with reference to FIG. 15-17 and proposed by the present invention, using an S-random bit-interleaver between a binary convolution encoder and a CPM modulator provides low error floors for the new pulse shape AV designed in accordance with an aspect of the invention.

The power and efficiency advantages offered by CPM generally come at the cost of complex receivers in order to implement the maximum likelihood sequence estimation algorithm for recovering the information signal. In many instances, the optimal maximum-likelihood detector requires a large bank of matched filters and a large number of trellis states at the receiver.

Laurent's decomposition approach has been used in designing reduced complexity CPM receivers. It is known that by using Laurent representation, a CPM signal can be represented as a sum of linearly modulated signals. Each of these individual signals is a pulse amplitude-modulated (PAM) waveform with pulses that follow the Laurent representation and a particular choice of pseudo-symbols to maintain the constant-envelope property of the CPM signal.

An important characteristic of Laurent pulses is that the signal energy is unevenly distributed amongst them and that the pulses are distinctively ordered. This property is exploited in reduced complexity detectors, which are based on a small subset of these pulses, and require a smaller filter bank and trellis size.

An alternate aspect of the present invention will be discussed next, where the proposed pulse shape AV is represented by a Laurent decomposition such that by retaining only the principal pulses at the receiver, complexity of the receiver can be reduced.

Referring back to FIG. 5, CPM modulator 502 may be replaced by a Laurent function generator for new pulse shape AV in an alternate aspect of the invention. In one example, it may be a combination of a pseudo symbol generator and a filter. For transmitter 500, it is recommended to use the exact representation with $S=M^{L-1}(M-1)$ to maintain constant-envelope property of CPM. As an example, for the $k^{th}$ carrier CPM signal 188 with M=4 and L=2, the information symbol $\alpha_{k,n} \in \{\pm 1, \pm 3\}$ going to CPM 514 is expressed as a sum of two binary symbols as $$\alpha_{k,n}=2\cdot\gamma_{n,1}^{(k)}+\gamma_{n,0}^{(k)},$$

where each binary symbol takes on value ±1.

CPM signal 188 for the $k^{th}$ carrier using Laurent function can now be represented as:

$$s_k(t) = \sum_{m=0}^{S-1} \sum_{n=0}^{N_a-1} \tilde{a}_{m,n}^{(k)} \cdot p_m(t-nT)$$

where pseudo-symbols $\tilde{a}_{m,n}^{(k)}$ are functions of the $k^{th}$ information symbol $\alpha_{k,n}$. Magnitude $p_m(t)$ of the Laurent pulses may be calculated as discussed below.

Referring back to FIG. 6, in an example embodiment, CPM detector 206 and correlator 602 can be replaced by a reduced complexity CPM detector and correlator in order to perform matched filtering for Laurent representation of AV pulses and provide an estimate of the information signal. For receiver 600, it is recommended to truncate the sum by retaining only the principal components, or S=M−1. This provides good tradeoff between complexity and performance.

The following recursions are useful in generating the pseudo-symbols $\tilde{a}_{m,n}^{(k)}$ corresponding to the principal pulses:

$$\tilde{a}_{0,n}^{(k)}=\tilde{a}_{0,n-1}^{(k)}\cdot e^{j\pi h\alpha_{k,n}}$$

$$\tilde{a}_{1,n}^{(k)}=\tilde{a}_{0,n-1}^{(k)}\cdot e^{j\pi h 2\cdot\gamma_{n1}^{(k)}}$$

$$\tilde{a}_{2,n}^{(k)}=\tilde{a}_{0,n-1}^{(k)}\cdot e^{j\pi h\gamma_{n0}^{(k)}}$$

Laurent pulses for phase response $q_{AV}(t)$ are computed as:

$$u_{AV}^{(l)}(t) = \begin{cases} \sin(2\pi h^{(l)} q_{AV}(t))/\sin(\pi h^{(l)}) & 0 \le t \le LT \\ u^{(l)}(2LT-t) & LT < t \le 2LT \\ 0 & \text{otherwise} \end{cases}$$

and $$c_k^{(l)}(t) = \prod_{i=0}^{L-1} u_{AV}^{(l)}(t+iT+\beta_{k,i}LT)$$

where $h^{(l)}=2^l \cdot h$ and $\beta_{k,i}$ is the $i^{th}$ bit in the radix-2 representation of k.

In this example embodiment, Laurent pulses are computed with M=4 and L=2, as shown in Table V below.

TABLE II

| Laurent Pulses for M = 4 and L = 2 | |
|---|---|
| m | $p_m(t)$ |
| 0 | $c_0^{(0)}(t) \cdot c_0^{(1)}(t)$ |
| 1 | $c_0^{(0)}(t+T) \cdot c_0^{(1)}(t)$ |
| 2 | $c_0^{(0)}(t) \cdot c_0^{(1)}(t+T)$ |
| 3 | $c_0^{(0)}(t+2T) \cdot c_0^{(1)}(t)$ |
| 4 | $c_0^{(0)}(t) \cdot c_0^{(1)}(t+2T)$ |
| 5 | $c_1^{(0)}(t) \cdot c_0^{(1)}(t)$ |
| 6 | $c_1^{(0)}(t) \cdot c_0^{(1)}(t+T)$ |
| 7 | $c_1^{(0)}(t) \cdot c_0^{(1)}(t+2T)$ |
| 8 | $c_0^{(0)}(t) \cdot c_1^{(1)}(t)$ |
| 9 | $c_0^{(0)}(t+T) \cdot c_1^{(1)}(t)$ |
| 10 | $c_0^{(0)}(t+2T) \cdot c_1^{(1)}(t)$ |
| 11 | $c_1^{(0)}(t) \cdot c_1^{(1)}(t)$ |

Laurent pulses computed using equations (39) and (40) for phase response $q_{AV}(t)$ will be discussed further using FIGS. 18 and 19.

Figure 18:
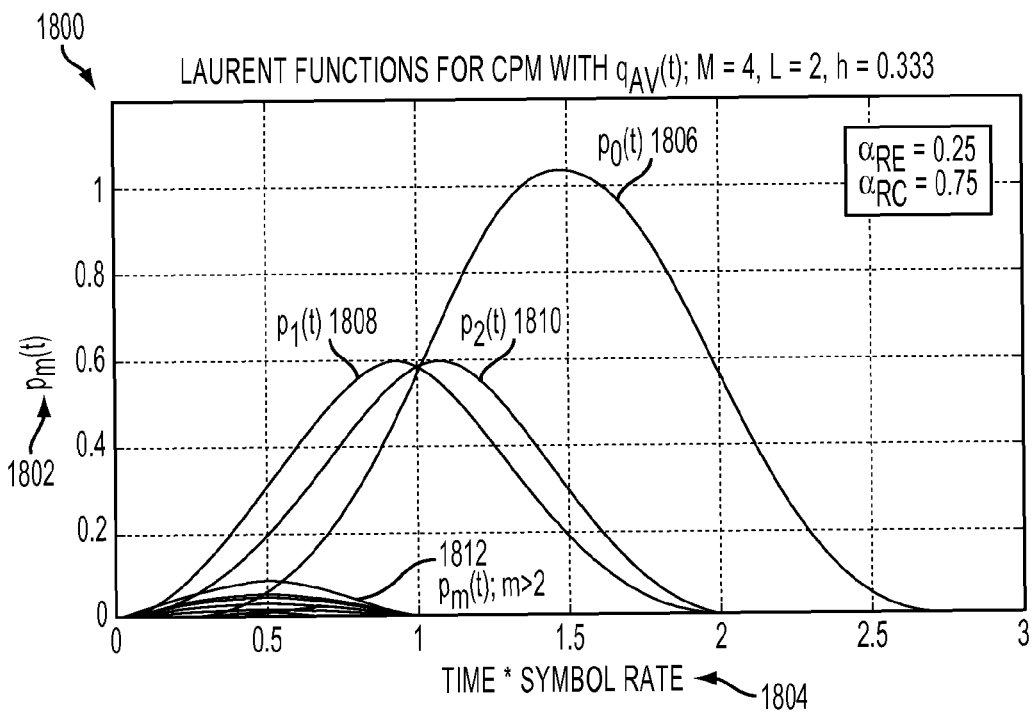
FIG. 18 is a graph of a Laurent function for CPM phase response $q_{4V}(t)$ as a function of time*symbol rate with $\alpha_{RE}=0.25$ and $\alpha_{RC}=0.75$ in accordance with another aspect of the invention.

FIG. 18 illustrates a graph 1800 of Laurent function for CPM phase response $q_{4V}(t)$ as a function of time*symbol rate with $\alpha_{RE}$=0.25 and $\alpha_{RC}$=0.75 in accordance with an aspect of the invention.

As illustrated in the figure, a y-axis 1802 represents magnitude of each Laurent pulse represented as $p_m(t)$, and an x-axis 1804 represents time duration of Laurent pulses as time*symbol rate. Graph 1800 includes a curve 1806, a curve 1808, a curve 1810 and a set of curves 1812.

As illustrated in the figure, Laurent pulses represented by curves 1806, 1808 and 1810 are the principal pulses in this example because they carry most of the signal information as shown by their magnitude. However, Laurent pulses represented by set of curves 1812 are not significant and therefore ignored. By using only the principal pulses, number of matched filters and the number of states in the trellis at the receiver can be reduced drastically. Magnitude of the Laurent pulses is dependent on the original pulse shape AV used to generate Laurent pulses at the transmitting source. Laurent decomposition for pulse shape AV with a different weighted average will be discussed next with reference to FIG. 19.

Figure 19:
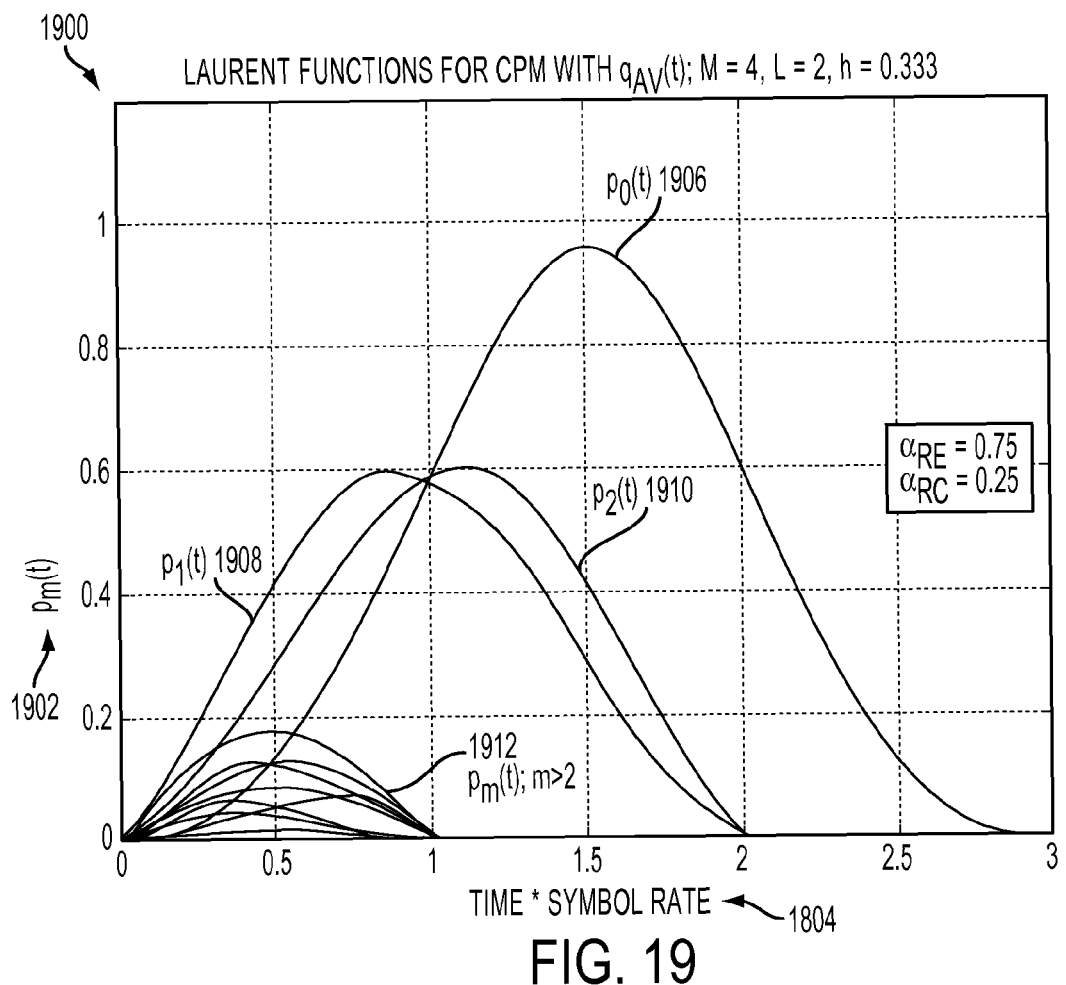
FIG. 19 is a graph of a Laurent function for CPM phase response $q_{4V}(t)$ as a function of time*symbol rate with $\alpha_{RE}=0.75$ and $\alpha_{RC}=0.25$ in accordance with another aspect of the invention.

FIG. 19 illustrates a graph 1900 of Laurent function for CPM phase response $q_{4V}(t)$ as a function of time*symbol rate with $\alpha_{RE}$=0.75 and $\alpha_{RC}$=0.25 in accordance with an aspect of the invention.

As illustrated in the figure, a y-axis 1902 represents magnitude of each Laurent pulse represented as $p_m(t)$, and an x-axis 1904 represents time duration of Laurent pulses as time*symbol rate. Graph 1900 includes a curve 1906, a curve 1908, a curve 1910 and a set of curves 1912.

As illustrated in the figure, Laurent pulses represented by curves 1906, 1908 and 1910 are the principal pulses in this example because they carry most of the signal information as shown by their magnitude. However, remainder Laurent pulses represented by set of curves 1912 are not significant and therefore ignored.

It's clear from FIGS. 18 and 19 that for larger value of REC pulse ($\alpha_{RE}$=0.75 and $\alpha_{RC}$=0.25), magnitude of the remainder pulses is larger. In both the examples, only three pulses are significant while the remainder pulses are relatively small.

At the transmitting source, in order to maintain the constant envelope property of the CPM signal, it's desirable to use all the Laurent pulses for transmission through the channel as the small pulses also contribute towards the magnitude of the Laurent pulses. However, at the receiver side, the number of Laurent pulses which are retained may be determined by the tradeoff between complexity and performance.

As discussed above, in accordance with an alternate aspect of the present invention, Laurent representation of the proposed pulse shape AV is suggested. By using the Laurent pulses, number of matched filters and the number of states in the trellis at the receiver can be reduced by using only the principal pulses, therefore, reducing the complexity of the receiver.

A new pulse shape for CPM is introduced which is obtained by a linear combination of well-known RC and REC pulse shapes. The new pulse shape addresses the tradeoff between the width of the PSD main lobe and the rate of decay of the side lobe to improve the coded performance of multi-carrier systems affected by ACI. Also, a methodology is proposed to design and evaluate the performance of the new pulse shape for multi-carrier, coded systems based on the modulation constrained capacity. Furthermore, a binary convolutional coder and a CPM modulator are concatenated using an S-random bit interleaver to lower the error floor. A multi-carrier system model with a transmitter, channel and a receiver is used to evaluate the performance of the new pulse shape as compared to RC and REC pulses in terms of power efficiency and bandwidth efficiency.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device comprising:
   a binary convolutional coder operable to output a binary code stream based on a source data stream; and
   a continuous phase modulator operable to output a modulated signal based on the binary code stream,
   wherein the modulated signal is based on a pulse shape,
   wherein $q_{av}$ is a continuous phase modulation phase response of a pulse shape for the modulator as a function of time,
   wherein $q_{rc}$ is a continuous phase modulation phase response of raised-cosine-shaped pulses as a function of time,
   wherein $q_{re}$ is a continuous phase modulation phase response of rectangular-shaped pulses as a function of time,
   wherein when $q_{rc}$ is less than $q_{re}$, then $q_{rc}<q_{av}<q_{re}$, and
   wherein when $q_{re}$ is less than $q_{rc}$, then $q_{re}<q_{av}<q_{rc}$.

2. The device of claim 1, wherein $q_{av}$ is a function of $q_{rc}$ and $q_{re}$.

3. The device of claim 2, wherein $q_{av}$ is a linear function of $q_{rc}$ and $q_{re}$.

4. The device of claim 3,
   wherein $q_{av}$ is a sum of and $\alpha_{rc}q_{rc}$ and $\alpha_{re}q_{re}$,
   wherein $0<\alpha_{rc}<1$, and
   wherein $0<\alpha_{re}<1-\alpha_{rc}$.

5. The device of claim 1, wherein $q_{av}$ is a linear function of $q_{rc}$ and $q_{re}$.

6. The device of claim 5,
   wherein $q_{av}$ is a sum of and $\alpha_{rc}q_{rc}$ and $\alpha_{re}q_{re}$,
   wherein $0<\alpha_{rc}<1$, and
   wherein $0<\alpha_{re}<1-\alpha_{rc}$.

7. The device of claim 1,
   wherein $q_{av}$ is a sum of $\alpha_{rc}q_{rc}$ and $\alpha_{re}q_{re}$,
   wherein $0<\alpha_{rc}<1$, and
   wherein $0<\alpha_{re}<1-\alpha_{rc}$.

8. A method comprising:
   outputting, by way of a binary convolutional coder, a binary code stream based on a source data stream; and
   outputting, by way of a continuous phase modulator, a modulated signal based on the binary code stream,
   wherein the modulated signal is based on a pulse shape,
   wherein $q_{av}$ is a continuous phase modulation phase response of a pulse shape for the modulator as a function of time,
   wherein $q_{rc}$ is a continuous phase modulation phase response of raised-cosine-shaped pulses as a function of time,
   wherein $q_{re}$ is a continuous phase modulation phase response of rectangular-shaped pulses as a function of time, wherein when $q_{rc}$ is less than $q_{re}$, then $q_{rc} < q_{av} < q_{re}$, and
wherein when $q_{re}$ is less than $q_{rc}$, then $q_{re} < q_{av} < q_{rc}$.

9. The method of claim 8, wherein $q_{av}$ is a function of $q_{rc}$ and $q_{re}$.

10. The method of claim 9, wherein $q_{av}$ is a linear function of $q_{rc}$ and $q_{re}$.

11. The method of claim 10,
wherein $q_{av}$ is a sum of $\alpha_{rc} q_{rc}$ and $\alpha_{re} q_{re}$,
wherein $0 < \alpha_{rc} < 1$, and
wherein $0 < \alpha_{re} < 1 - \alpha_{rc}$.

12. The method of claim 8, wherein $q_{av}$ is a linear function of $q_{rc}$ and $q_{re}$.

13. The method of claim 12,
wherein $q_{av}$ is a sum of $\alpha_{rc} q_{rc}$ and $\alpha_{re} q_{re}$,
wherein $0 < \alpha_{rc} < 1$, and
wherein $0 < \alpha_{re} < 1 - \alpha_{rc}$.

14. The method of claim 8,
wherein $q_{av}$ is a sum of $\alpha_{rc} q_{rc}$ and $\alpha_{re} q_{re}$,
wherein $0 < \alpha_{rc} < 1$, and
wherein $0 < \alpha_{re} < 1 - \alpha_{rc}$.

15. A method comprising:
receiving a modulated signal;
outputting, by way of a matched filter bank, a demodulated stream based on the modulated stream of pulses; and
outputting, by way of a binary convolutional decoder, a stream of bits based on the demodulated stream,
wherein the modulated signal is based on a pulse shape,
wherein $q_{av}$ is a continuous phase modulation phase response of a pulse shape for the modulator as a function of time,
wherein $q_{rc}$ is a continuous phase modulation phase response of raised-cosine-shaped pulses as a function of time,
wherein $q_{re}$ is a continuous phase modulation phase response of rectangular-shaped pulses as a function of time, and
wherein when $q_{rc}$ is less than $q_{re}$, then $q_{rc} < q_{av} < q_{re}$, and
wherein when $q_{re}$ is less than $q_{rc}$, then $q_{re} < q_{av} < q_{rc}$.

16. The method of claim 15, wherein $q_{av}$ is a function of $q_{rc}$ and $q_{re}$.

17. The method of claim 16, wherein $q_{av}$ is a linear function of $q_{rc}$ and $q_{re}$.

18. The method of claim 17,
wherein $q_{av}$ is a sum of $\alpha_{rc} q_{rc}$ and $\alpha_{re} q_{re}$,
wherein $0 < \alpha_{rc} < 1$, and
wherein $0 < \alpha_{re} < 1 - \alpha_{rc}$.

19. The method of claim 15, wherein $q_{av}$ is a linear function of $q_{rc}$ and $q_{re}$.

20. The method of claim 19,
wherein $q_{av}$ is a sum of $\alpha_{rc} q_{rc}$ and $\alpha_{re} q_{re}$,
wherein $0 < \alpha_{rc} < 1$, and
wherein $0 < \alpha_{re} < 1 - \alpha_{rc}$.

* * * * *